(12) United States Patent
Comak et al.

(10) Patent No.: US 12,342,168 B2
(45) Date of Patent: Jun. 24, 2025

(54) METHOD AND SYSTEM FOR DATA ACCESS AUTHORIZATION VIA A DATA COLLECTION COORDINATION FUNCTION

(71) Applicant: Telefonaktiebolaget LM Ericsson (publ), Stockholm (SE)

(72) Inventors: Pinar Comak, Ankara (TR); Christine Jost, Dalby (SE); Ferhat Karakoc, Istanbul (TR); Ulf Mattsson, Kungsbacka (SE); Zhang Fu, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 111 days.

(21) Appl. No.: 18/259,926

(22) PCT Filed: Dec. 21, 2021

(86) PCT No.: PCT/EP2021/086976
§ 371 (c)(1),
(2) Date: Jun. 29, 2023

(87) PCT Pub. No.: WO2022/144231
PCT Pub. Date: Jul. 7, 2022

(65) Prior Publication Data
US 2024/0163672 A1 May 16, 2024

Related U.S. Application Data

(60) Provisional application No. 63/132,941, filed on Dec. 31, 2020.

(51) Int. Cl.
*H04W 12/084* (2021.01)

(52) U.S. Cl.
CPC .................. *H04W 12/084* (2021.01)

(58) Field of Classification Search
CPC . H04W 12/084; H04W 12/069; H04W 12/08; H04L 9/3213
See application file for complete search history.

(56) References Cited

U.S. PATENT DOCUMENTS 12,034,733 B2 * 7/2024 Khare ............... H04L 67/56
2022/0052989 A1 * 2/2022 Zhao ................ H04L 63/08
(Continued)

FOREIGN PATENT DOCUMENTS

WO 2020221219 A1 11/2020

OTHER PUBLICATIONS

3GPP, "3rd Generation Partnership Project; Technical Specification Group Radio Access Network; NG-RAN; Architecture description (Release 15)", 3GPP TS 38.401 V15.6.0, Jul. 2019, 1-46.
(Continued)

*Primary Examiner* — J. Brant Murphy
(74) *Attorney, Agent, or Firm* — Murphy, Bilak & Homiller, PLLC

(57) ABSTRACT

The invention relates to a method for a data consumer network function, NF, of a communication network to collect data from a data producer NF, the method comprising: ○sending (810), to a network repository function, NRF, in the communication network, a request for an access token for a service provided by a data collection coordination function, DCCF, in the communication network; ○receiving (820), from the NRF, at least one access token for the service provided by the DCCF; and ○using (830) the at least one access token, collecting data from the data producer NF in the communication network via the DCCF service.

18 Claims, 14 Drawing Sheets

(56) References Cited

U.S. PATENT DOCUMENTS

2022/0116400 A1* 4/2022 Khare ................ H04L 63/083
2023/0362199 A1* 11/2023 Adam ................ H04L 67/303
2024/0129710 A1* 4/2024 Khare ................ H04W 48/16

OTHER PUBLICATIONS

3GPP, "3rd Generation Partnership Project; Technical Specification Group Radio Access Network; Study on new radio access technology: Radio access architecture and interfaces (Release 14)", 3GPP TR 38.801 V14.0.0, Mar. 2017, 1-91.

3GPP, "3rd Generation Partnership Project; Technical Specification Group Services and System Aspects; 3GPP System Architecture Evolution (SAE); Security architecture (Release 15)", 3GPP TS 33.401 V15.8.0, Jun. 2019, 1-163.

3GPP, "3rd Generation Partnership Project; Technical Specification Group Services and System Aspects; Procedures for the 5G System (5GS); Stage 2 (Release 16)", 3GPP TS 23.502 V16.7.0, Dec. 2020, 1-603.

3GPP, "3rd Generation Partnership Project; Technical Specification Group Services and System Aspects; Security architecture and procedures for 5G system (Release 17)", 3GPP TS 33.501 V17.0.0, Dec. 2020, 1-253.

3GPP, "3rd Generation Partnership Project; Technical Specification Group Services and System Aspects; Study on enablers for network automation for the 5G System (5GS); Phase 2 (Release 17)", 3GPP TR 23.700-91 V17.0.0, Dec. 2020, 1-382.

3GPP, "3rd Generation Partnership Project; Technical Specification Group Services and System Aspects; System Architecture for the 5G System; Stage 2 (Release 15)", 3GPP TS 23.501 V15.5.0, Mar. 2019, 1-241.

Jones, M., et al., "JSON Web Signature (JWS)", Internet Engineering Task Force (IETF), Request for Comments: 7515, Category: Standards Track, May 2015, 1-59.

Jones, M., et al., "JSON Web Token (JWT)", Internet Engineering Task Force (IETF), Request for Comments: 7519, Category: Standards Track, ISSN: 2070-1721, May 2015, 1-30.

Unknown, Author, "New solution for service access authorization within a NF set", 3GPP TSG-SA WG3 Meeting #95, S3-191416 revision of S3-19xabc, Reno (US), May 6-10, 2019, 1-3.

* cited by examiner

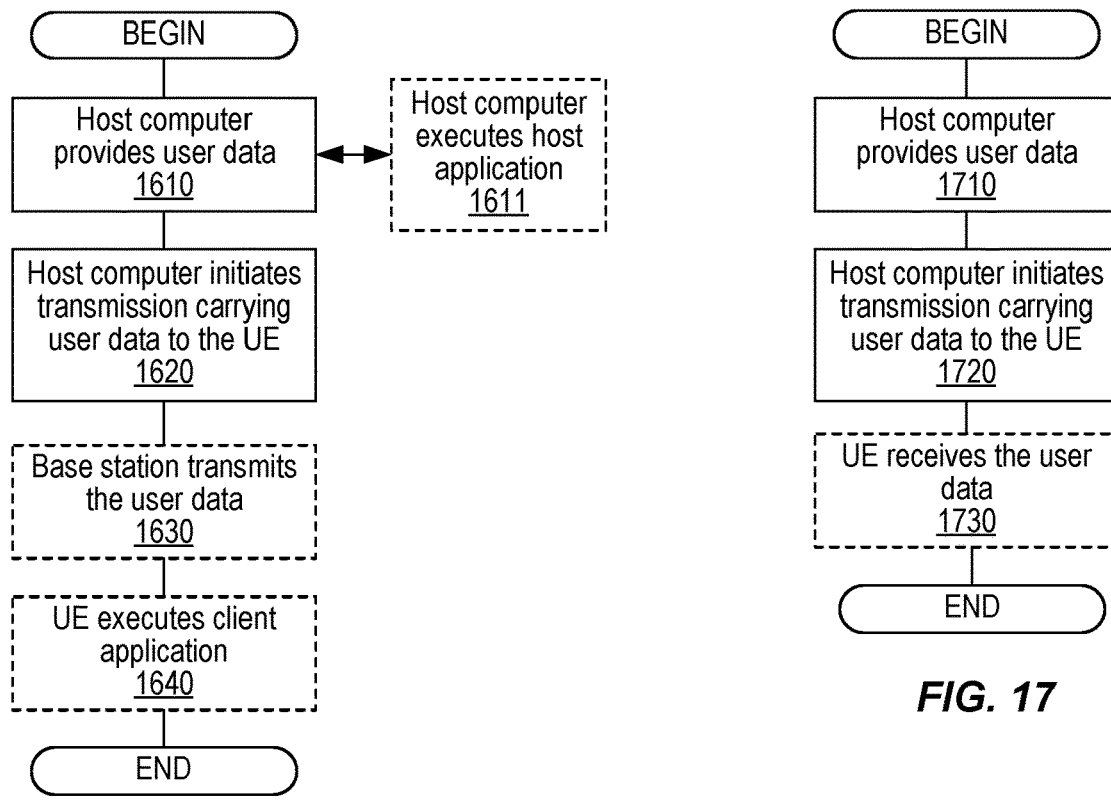
FIG. 16
FIG. 17
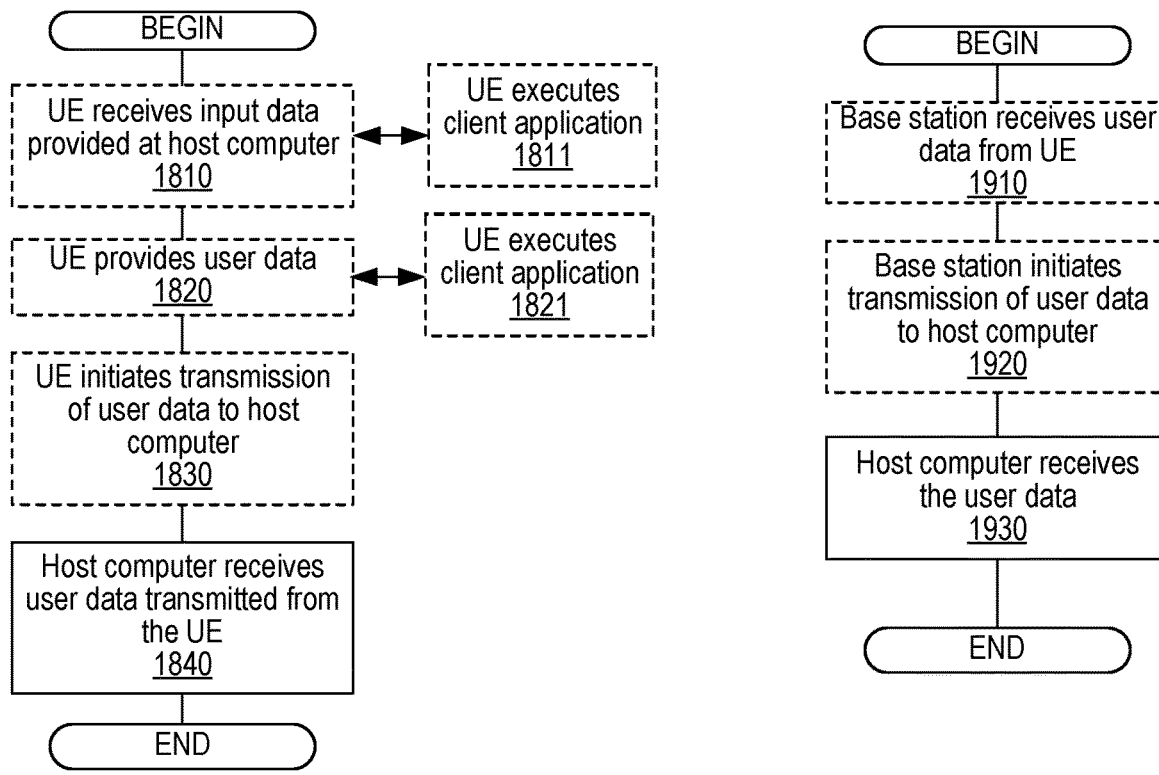
FIG. 18
FIG. 19

METHOD AND SYSTEM FOR DATA ACCESS AUTHORIZATION VIA A DATA COLLECTION COORDINATION FUNCTION

TECHNICAL FIELD

The present application relates generally to the field of communication networks, and more specifically to techniques for authorizing network functions, NFs, to collect and/or consume data produced by other NFs in a communication network.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

At a high level, the 5G System (5GS) consists of an Access Network (AN) and a Core Network (CN). The AN provides UEs connectivity to the CN, e.g., via base stations such as gNBs or ng-eNBs described below. The CN includes a variety of Network Functions (NF) that provide a wide range of different functionalities such as session management, connection management, charging, authentication, etc.

FIG. 1 illustrates a high-level view of an exemplary 5G network architecture, consisting of a Next Generation Radio Access Network (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 112, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, as described in more detail below.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof. Each of the gNBs can serve a geographic coverage area including one more cells and, in some cases, can also use various directional beams to provide coverage in the respective cells.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501 (v15.5.0). If security protection for CP and UP data on TNL of NG-RAN interfaces is supported, NDS/IP (3GPP TS 33.401 (v15.8.0)) shall be applied.

The NG RAN logical nodes shown in FIG. 1 (and described in 3GPP TS 38.401 (v15.6.0) and 3GPP TR 38.801 (v14.0.0)) include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry.

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Each of the gNBs may include and/or be associated with a plurality of Transmission Reception Points (TRPs). Each TRP is typically an antenna array with one or more antenna elements and is located at a specific geographical location. In this manner, a gNB associated with multiple TRPs can transmit the same or different signals from each of the TRPs. For example, a gNB can transmit different version of the same signal on multiple TRPs to a single UE. Each of the TRPs can also employ beams for transmission and reception towards the UEs served by the gNB, as discussed above. In some embodiments, the TRPs may be associated with gNB-DUs.

Another change in 5G networks (e.g., in 5GC) is that traditional peer-to-peer interfaces and protocols found in earlier-generation networks are modified and/or replaced by a Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context. This 5G SBA model is based on principles including modularity, reusability and self-containment of NFs, which can enable network deployments to take advantage of the latest virtualization and software technologies.

Token-based authorization for the SBA is defined in 3GPP TS 33.501. This mechanism involves a consumer for a NF service (referred to as "NF Service Consumer" or more simply "Service Consumer") obtaining an access token for the desired service from an authorization server before access the service. Access tokens are JSON Web Tokens as described in RFC 7519 (published by IETF) and are secured with digital signatures or Message Authentication Codes (MAC) based on JSON Web Signature (JWS) as described in IETF RFC 7515.

Indirect communication in SBA was specified in 3GPP Rel-16, using a Service Communication Proxy (SCP) as a standardized proxy between Service Consumers and Service Producers. With respect to token-based authorization, Rel-16 added the capability for the SCP to request access tokens on behalf of Service Consumers.

3GPP Rel-17 enhances the SBA by adding a Data Management Framework that includes a Data Collection Coordination Function (DCCF) and a messaging framework. Data consumers ask DCCF for data collection in relation to a data source. The DCCF subscribes to the data source (if it does not have a subscription already) and then coordinates the request and data delivery using the messaging framework. The data source inputs the requested data to the messaging framework, which delivers the data to the data consumer.

However, there are various problems, issues, and/or difficulties that can occur when using access tokens for data collection via the Data Management Framework.

SUMMARY

Accordingly, exemplary embodiments of the present disclosure address these and other problems, issues, and/or difficulties that can occur at failover, thereby enabling the otherwise-advantageous deployment of redundant 5GC functionality.

Some embodiments of the present disclosure include methods (e.g., procedures) for a data consumer network function (NF), of a communication network. These exemplary methods can be performed by various NFs and/or network nodes in the communication network (e.g., 5GC).

These exemplary methods can include sending, to a network repository function (NRF) in the communication network, a request for an access token for a service provided by a data collection coordination function (DCCF) in the communication network. These exemplary methods can also include receiving, from the NRF, at least one access token for the service provided by the DCCF. These exemplary methods can also include, using the at least one access token, collecting data from a data producer NF in the communication network via the service provided by the DCCF.

In some embodiments, the collecting operations can include sending the received at least one access token to the DCCF and receiving the data from the data producer NF. In some embodiments, the data can be received from the data producer NF via a messaging framework associated with the DCCF.

In various embodiments, the request for the access token can include a name or identifier of the service provided by the DCCF. In some of these embodiments, a single access token can be received from the NRF and can include an identifier of the DCCF and an identifier of the service provided by the DCCF. In such embodiments, the single access token can be sent to the DCCF together with an identifier of data to be collected and information about a producer of the data to be collected.

In other of these embodiments, the request for the access token can also include an identifier of data to be collected and/or information about a producer of the data to be collected. In such embodiments, a single access token can be received from the NRF and sent to the DCCF. In such case, the single access token can include:
an identifier of the DCCF;
an identifier of the service provided by the DCCF;
an identifier of the data producer NF;
an identifier of the data producer service; and
an identifier of the data to be collected.

In a variant of these embodiments, first and second access tokens can be received from the NRF and sent to the DCCF. In such case, the first access token can include an identifier of the DCCF and an identifier of the service provided by the DCCF. Likewise, the second access token can include identifiers of the data producer NF, the data procedure service, and the data to be collected.

Other embodiments include exemplary methods (e.g., procedures) for a data collection coordination function (DCCF) of a communication network (e.g., 5GC). These exemplary methods can include receiving, from a data consumer network function (NF) in the communication network, at least one access token for a service provided by the DCCF in relation to data to be collected by the data consumer NF. These exemplary methods can also include, based on the at least one access token, determining whether the data consumer NF is authorized to access the service provided by the DCCF and the data to be collected. These exemplary methods can also include, based on determining that the data consumer NF is authorized to access both the service provided by the DCCF and the data to be collected, performing the service provided by the DCCF to request a data producer NF to provide the data to the data consumer NF.

Other embodiments include exemplary methods (e.g., procedures) for a data collection coordination function (DCCF) of a communication network (e.g., 5GC). These exemplary methods can include receiving, from a data consumer network function (NF) in the communication network, at least one access token for a service provided by the DCCF in relation to data to be collected by the data consumer NF. These exemplary methods can also include, based on the at least one access token, determining whether the data consumer NF is authorized to access to the service provided by the DCCF. These exemplary methods can also include determining whether the data consumer NF is authorized to access the data to be collected. These exemplary methods can also include, based on determining that the data consumer NF is authorized to access both the service provided by the DCCF and the data to be collected, performing the service provided by the DCCF to request a data producer NF to provide the data to the data consumer NF.

In some embodiments, a single access token can be received from the data consumer NF and includes an identifier of the DCCF and an identifier of the service provided by the DCCF. In such embodiments, the single access token can be received together with an identifier of data to be collected and/or information about a data producer NF of the data to be collected.

In these embodiments, the determining operations can include sending, to a network repository function (NRF) in the communication network, a request for authorization of the data consumer NF to access the data to be collected. For example, the request for authorization can include identifiers of the data consumer NF, the data producer NF, the data procedure service, and the data to be collected. Additionally, the determining operations can include receiving, from the NRF, an authorization result that indicates whether the data consumer NF is authorized to access the data to be collected.

In other embodiments, a single access token can be received from the data consumer NF and can include:
- an identifier of the DCCF;
- an identifier of the service provided by the DCCF;
- an identifier of the data producer NF;
- an identifier of the data producer service; and
- an identifier of the data to be collected.

In a variant of these embodiments, first and second access tokens can be received from the data consumer NF. In such case, the first access token can include an identifier of the DCCF and an identifier of the service provided by the DCCF. Likewise, the second access token can include identifiers of the data producer NF, the data procedure service, and the data to be collected. In this variant, determining whether the data consumer NF is authorized to access the data to be collected can be performed by the DCCF without sending the second access token to the data producer NF.

In some embodiments, these exemplary methods can also include, based on determining that the data consumer NF is authorized to access the data to be collected, initializing a messaging framework associated with the DCCF to transport the data from the data producer NF to the data consumer NF.

Other embodiments include methods (e.g., procedures) for a network repository function (NRF) of a communication network. These exemplary methods can include receiving, from a data consumer network function (NF) in the communication network, a request for an access token for a service provided by a data collection coordination function (DCCF) in the communication network. These exemplary methods can also include determining whether the data consumer NF is authorized to access the service provided by the DCCF and data to be collected from a data producer NF via the service provided by the DCCF. These exemplary methods can also include, based on determining that the data consumer NF is authorized to access the service provided by the DCCF and the data to be collected, providing one of the following:
- at least one access token for the service provided by the DCCF and for the data; or
- an access token for the service provided by the DCCF and an authorization for the data.

In various embodiments, the request for the access token can include a name or identifier of the service provided by the DCCF. In some of these embodiments, a single access token can be provided to the data consumer NF and includes an identifier of the DCCF and an identifier of the Service provided by the DCCF. In such embodiments, these exemplary methods can also include receiving, from the DCCF, a request for authorization of the data consumer NF to access the data to be collected. In such case, the authorization for the data can be provided to the DCCF in response to the request.

In other of these embodiments, the request for the access token can also include an identifier of data to be collected and/or information about a producer of the data to be collected. In such embodiments, a single access token for the Service provided by the DCCF and the data can be provided to the data consumer NF. In such case, the single access token can include:
- an identifier of the DCCF;
- an identifier of the Service provided by the DCCF;
- an identifier of the data producer NF;
- an identifier of the data producer service; and
- an identifier of the data to be collected.

In a variant of these embodiments, first and second access tokens can be provided to the data consumer NF. In such case, the first access token can be for the service provided by the DCCF and can include an identifier of the DCCF and an identifier of the service provided by the DCCF. Likewise, the second access token can be for the data and can include identifiers of the data producer NF, the data procedure service, and the data to be collected.

Other embodiments include data consumer NFs, DCCFs, and NRFs (or network nodes hosting the same) that are configured to perform the operations corresponding to any of the exemplary methods described herein. Other embodiments also include non-transitory, computer-readable media storing computer-executable instructions that, when executed by processing circuitry associated with such NFs, DCCFs, and NRFs, configure the same to perform operations corresponding to any of the exemplary methods described herein.

These and other objects, features, and advantages of the present disclosure will become apparent upon reading the following Detailed Description in view of the Drawings briefly described below.

BRIEF DESCRIPTION OF THE DRAWINGS

FIGS. 16-19 are flow diagrams of exemplary methods (e.g., procedures) for transmission and/or reception of user data, according to various exemplary embodiments of the present disclosure.

DETAILED DESCRIPTION

Figure 1:
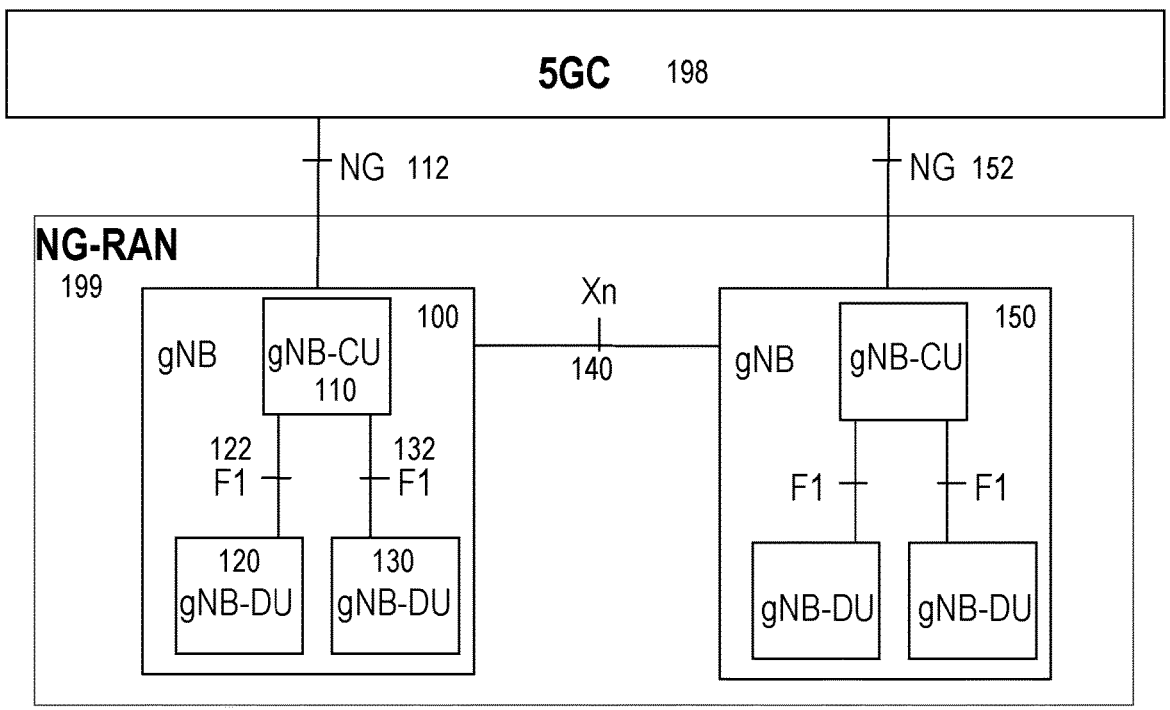
FIGS. 1-2 illustrate various aspects of an exemplary 5G network architecture.

Exemplary embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features and advantages of the disclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node (or component thereof such as MT or DU), a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), etc. A core network node can also be a node that implements a particular core network function (NF), such as an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, mobile terminals (MTs), etc.

Radio Node: As used herein, a "radio node" can be either a "radio access node" (or equivalent term) or a "wireless device."

Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Node: As used herein, the term "node" (without any prefix) can be any type of node that is capable of operating in or with a wireless network (including a RAN and/or a core network), including a radio access node (or equivalent term), core network node, or wireless device.

Service: As used herein, the term "service" refers generally to a set of data, associated with one or more applications, that is to be transferred via a network with certain specific delivery requirements that need to be fulfilled in order to make the applications successful.

Component: As used herein, the term "component" refers generally to any component needed for the delivery of a service. Examples of component are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation, storage. In general, each component can have a "manager", which is an entity that can collect historical information about utilization of resources as well as provide information about the current and the predicted future availability of resources associated with that component (e.g., a RAN manager).

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, there are various problems, issues, and/or difficulties that can occur when using access tokens for data collection via the Data Management Framework proposed for 3GPP Rel-17. These are discussed in more detail below after the following description of various features of the 5G SBA.

Figure 2:
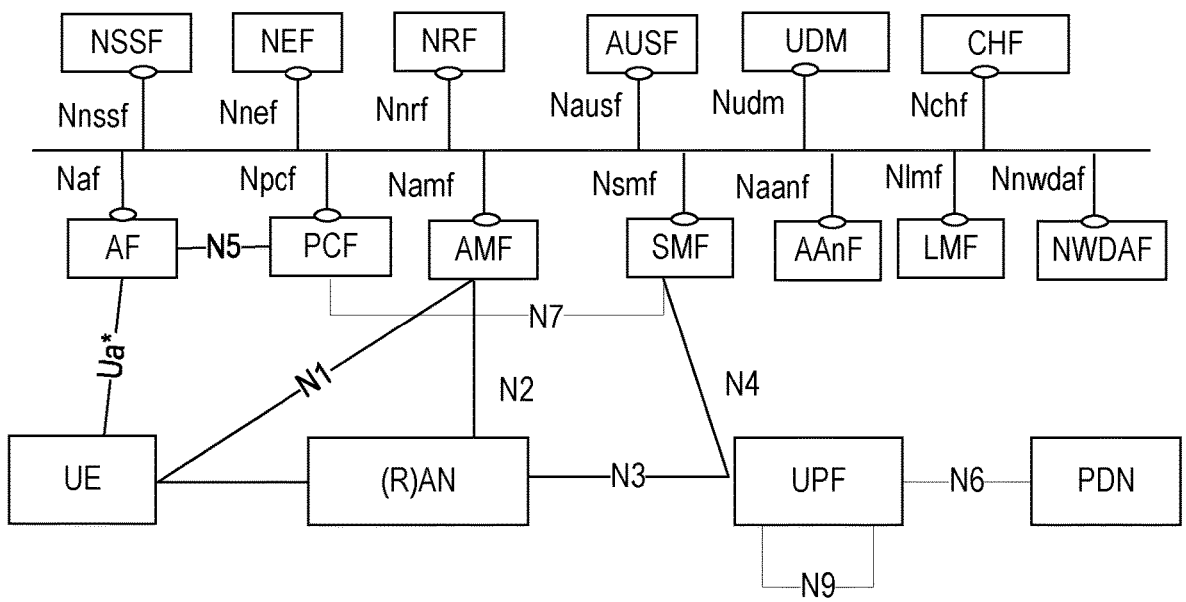

FIG. 2 shows an exemplary non-roaming 5G reference architecture with service-based interfaces and various 3GPP-defined NFs within the Control Plane (CP). These include the following NFs, with additional details provided for those most relevant to the present disclosure:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e., signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF)— supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g., bytes, seconds) for a service. CHF also interacts with billing systems.

Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point.

Network Exposure Function (NEF) with Nnef interface— acts as the entry point into operator's network, by securely exposing to AFs the network capabilities and events provided by 3GPP NFs and by providing ways for the AF to securely provide information to 3GPP network. For example, NEF provides a service that allows an AF to provision specific subscription data (e.g., expected UE behavior) for various UEs.

Network Repository Function (NRF) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g., compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

Network Data Analytics Function (NWDAF) with Nnwdaf interface—provides network analytics information (e.g., statistical information of past events and/or predictive information) to other NFs on a network slice instance level.

Location Management Function (LNIF) with Nlmf interface—supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function supports generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

The NRF allows every NF to discover the services offered by other NFs, and Data Storage Functions (DSF) allow every NF to store its context. In addition, the NEF provides exposure of capabilities and events of the 5GC to AFs within and outside of the 5GC. For example, NEF provides a service that allows an AF to provision specific subscription data (e.g., expected UE behavior) for various UEs.

Communication links between the UE and a 5G network (AN and CN) can be grouped in two different strata. The UE communicates with the CN over the Non-Access Stratum (NAS), and with the AN over the Access Stratum (AS). All the NAS communication takes place between the UE and the AMF via the NAS protocol (N1 interface in FIG. 2).

Security for the communications over this these strata is provided by the NAS protocol (for NAS) and the PDCP protocol (for AS).

As mentioned above, 3GPP Rel-17 enhances the SBA by adding a Data Management Framework that includes a Data Collection Coordination Function (DCCF) and a messaging framework, which is defined in detail in 3GPP TR 23.700-91 (v17.0.0) section 6.9. The Data Management Framework is backward compatible with a Rel-16 NWDAF function, described above. For Rel-17, the baseline for services offered by the DCCF (e.g., to an NWDAF Analytics Function) are the Rel-16 NF Services used to obtain data. In the following, "service provided by the DCCF" is called in short DCCF service. For example, the baseline for the DCCF service used by an NWDAF consumer to obtain UE mobility data is Namf EventExposure.

A Rel-16 NWDAF can coexist with a Rel-17 NWDAF and the Data Management Framework. A Rel-16 NWDAF continues to request data directly from NFs without using the Data Management Framework and provides analytics to consumers that discover the Rel-16 NWDAF. A Rel-17 NWDAF can request data from the Data Management Framework, and if the data is not collected already, the Data Management Framework would request the data from a data source. In other words, a data source would independently send Data to the Rel-16 NWDAF that sent a request directly to the Data Source, and to the Data Management Framework that sent a request for the Rel-17 NWDAF.

In Rel-17, the NWDAF is decomposed by moving Data Collection, including the task of identifying the Data Source, to the Data Management Framework. The Rel-17 NWDAF requests data from the Data Management Framework but may not query other NFs (e.g., NRF, UDM, etc.) to determine which NF instance serves a UE, nor need it be concerned about life cycles of Data Source NFs, as was the case for Rel-16 NWDAF. This decomposition also allows other NFs to obtain data via the Data Management Framework and avoids duplicate data collection from the same Data Source. The Rel-17 NWDAF (without Data Collection) may be referred to as the "NWDAF Analytics Function."

Figure 3:
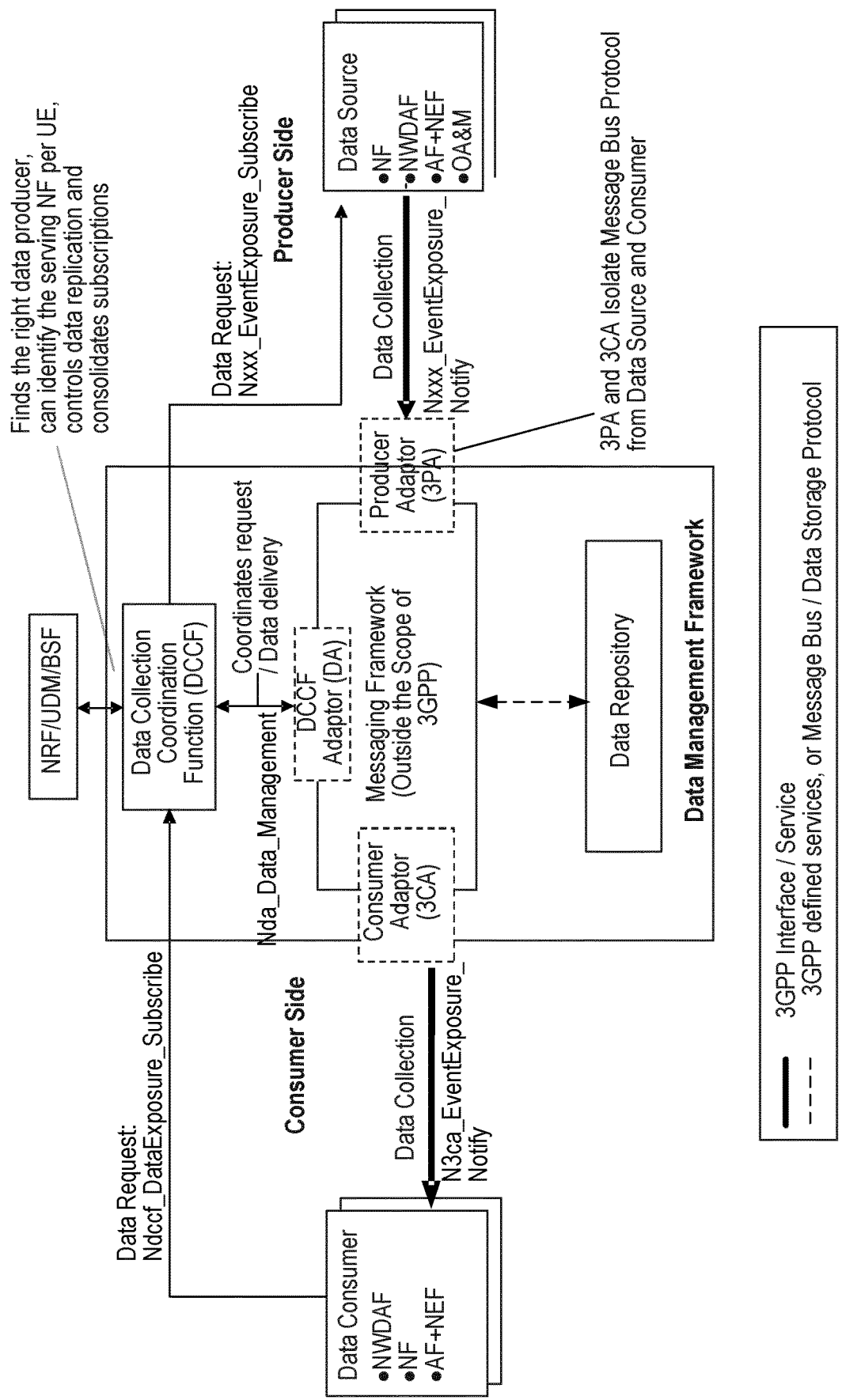
FIG. 3 illustrates a high-level view of the 3GPP Rel-17 Data Management Framework.

FIG. 3 illustrates a high-level view of the Rel-17 Data Management Framework. The main components are the DCCF which communicates with other NFs; the Messaging Framework, which is outside the scope of 3GPP standardization; and a Data Repository. The DCCF optionally includes a DCCF Adaptor (DA) used to communicate with the Messaging Framework, which optionally includes a Consumer Adaptor (3CA) and/or a Producer Adaptor (3PA) used to communicate with a Data Consumer and a Data Source, respectively. The DA, 3CA, and 3PA may be standalone or combined with the DCCF, Data Consumer, and Data Source, respectively. Exemplary Data Consumers include the NWDAF Analytics Function an NF requesting analytics, but as with other NF services, nothing precludes other Consumer NFs. The Data Management Framework is compatible with both a 3GPP-defined Data Repository Function for ML/Analytics and Data Repositories that are not 3GPP-defined.

The DCCF is a control-plane function that coordinates data collection and triggers data delivery to Data Consumers. A DCCF may support multiple Data Sources, Data Consumers, and Message Frameworks. However, to prevent duplicate data collection, each Data Source is associated with only one DCCF. The DCCF provides the 3GPP defined Ndccf_DataExposure Service to Data Consumers and uses the services of Data Sources to obtain data. Although FIG. 3 shows one DCCF for the 5GC, there can be multiple instances of the DCCF, e.g., for network slices, geographic regions where Data Sources reside or for different Data Source types. For DCCF discovery, the DCCF registers with the NRF and is discovered by Consumers or an SCP using the registration and discovery procedures defined for the NF Service Framework in 3GPP TS 23.502 (v16.7.0).

A DCCF receives data requests from Data Consumers via the Ndccf_DataExposure service. If a Data Source is not specified in the Data Request, the DCCF determines the Data Source that can provide the data requested by the Data Consumer. For example, if the request is for UE-specific data, the DCCF may query the other NFs (e.g., NRF, UDM, etc.) to determine which NF instance is serving the UE. If the Data Source is specified in the Data Request (e.g., the Data Consumer is configured with Data Sources), the DCCF checks whether the data is already collected from the Data Source. If not, will request the data from the specified Data Source.

Additionally, the DCCF may determine if the requested data is currently being produced by any Data Source and being provided to the Messaging Framework. If the requested data is not being produced and/or provided, the DCCF sends a new subscription/request towards the Data Source to trigger a new data collection, and the DCCF then subscribes with the messaging framework for the Data Consumer to receive future notifications associated with the desired Data Source.

As mentioned above, token-based authorization is defined in 3GPP TS 33.501. This mechanism involves a consumer for a NF service (referred to as "NF Service Consumer" or more simply "Service Consumer") obtaining an access token for the desired service from an authorization server before access the service. Access tokens are JSON Web Tokens as described in IETF RFC 7519 and are secured with digital signatures or Message Authentication Codes (MAC) based on JSON Web Signature (JWS) as described in IETF RFC 7515.

Figure 4:
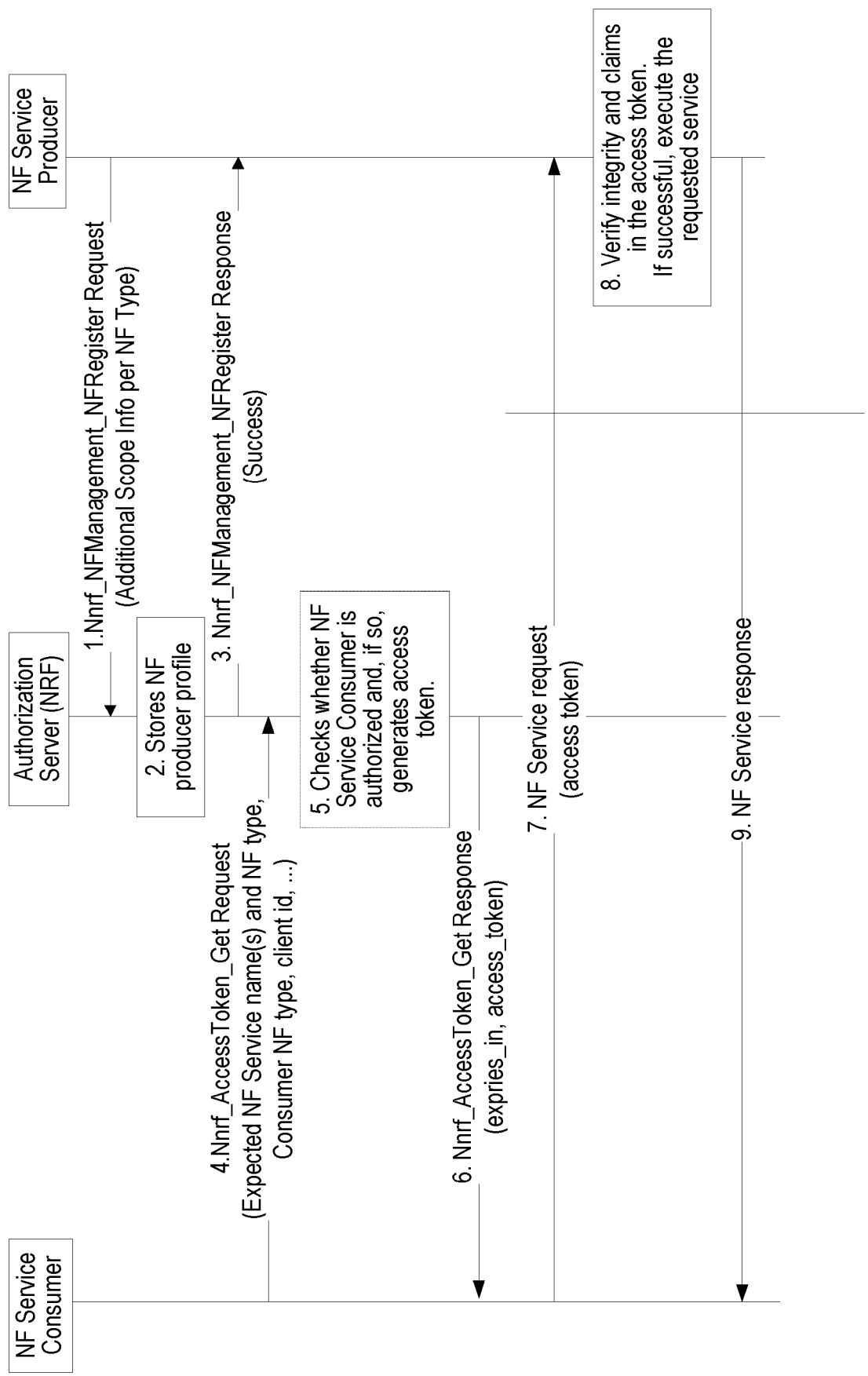
FIGS. 4-5 are signal flow diagrams illustrating two different techniques for token-based authorization for access to 5G network function (NF) services.

FIG. 4 shows a signal flow diagram illustrating token-based authorization for access to NF services. Operations 1-3 are part of the NF Service registration procedure in which the NF Service Producer provides information about the NF Service to the NRF, which stores this information in a NF producer profile. The service information may identify resources and actions (or service operations) that are allowed for NF Service Consumers.

In operation 4, a NF Service Consumer requests an access token from the NRF using the Nnrf_AccessToken_Get Request operation. The message includes the NF Instance ID(s) of the NF Service Consumer, the requested "scope" including the expected NF Service name(s), optionally "additional scope" information (e.g., requested resources and requested service operations on the resources), and NF types of the expected NF Service Producer instance and of the NF Service Consumer.

In operation 5, the NRF checks whether the NF Service Consumer is authorized to access the requested service(s). If the NF Service Consumer is authorized, the NRF generates an access token with appropriate claims included. The NRF digitally signs the generated access token based on a shared secret or private key as described in RFC 7515. If the NF Service Consumer is not authorized, the NRF does not issue the access token. In operation 6, the NRF sends the access token to the NF Service Consumer in an Nnrf_AccessToken_Get Response operation.

In operation 7, the NF Service Consumer requests service from the NF Service Producer and includes the obtained access token. In operation 8, the NF Service Producer verifies the access token integrity and claims within the access token. If successful, the NF Service Producer provides the requested service to the NF Service Consumer in operation 9.

Figure 5:
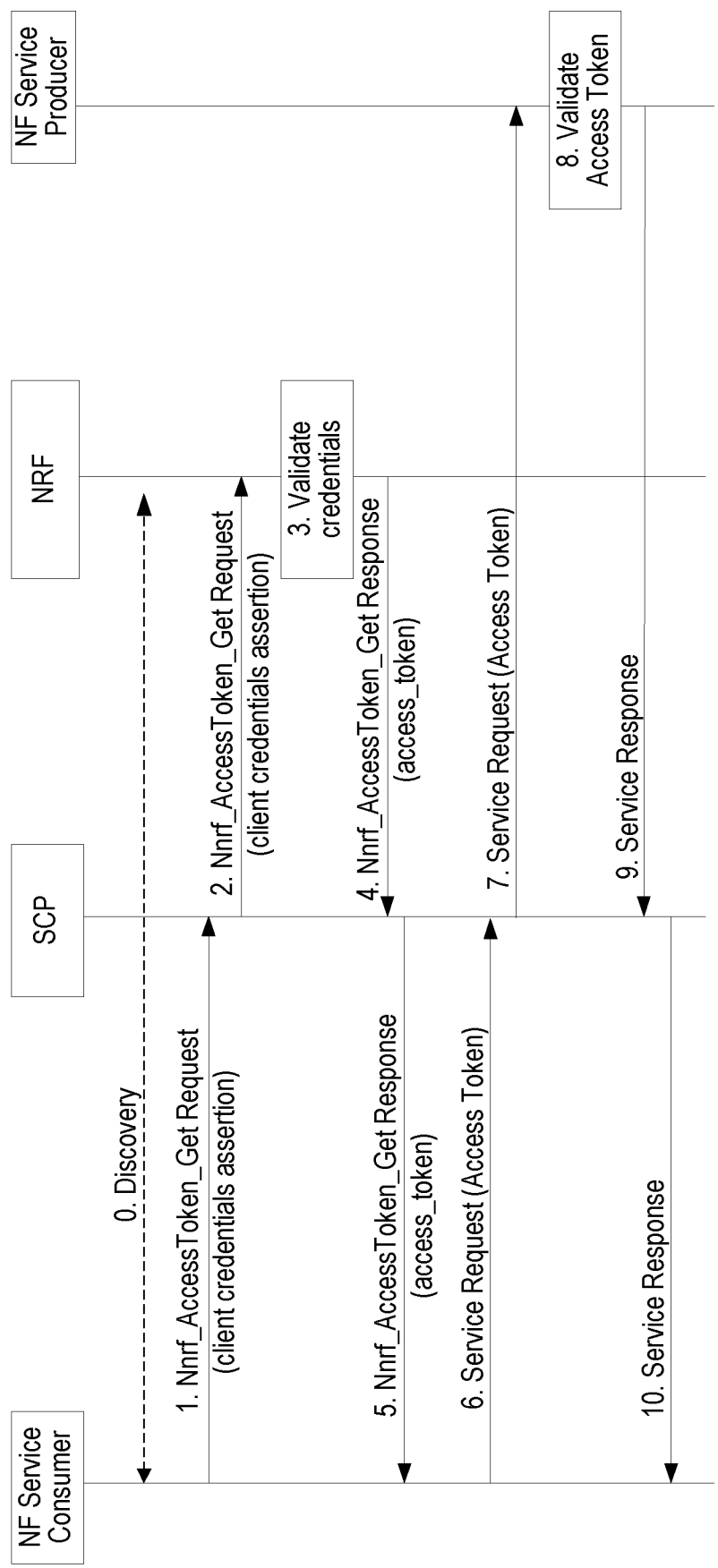

As mentioned above, indirect communication in SBA was specified in 3GPP Rel-16, using a Service Communication Proxy (SCP) as a standardized proxy between Service Consumers and Service Producers. With respect to token-based authorization, Rel-16 added the capability for the SCP to request access tokens on behalf of Service Consumers. FIG. 5 shows a signal flow diagram illustrating token-based authorization for access to NF services using an SCP. A notable difference from FIG. 4 is that the NF Service Consumer obtains both the service access token and the service itself using the SCP as an intermediary.

Even so, it is unclear how data access authorization should be requested and obtained when DCCF and the messaging framework shown in FIG. 3 are used for data collection. One solution can be usage of SCP-like functionality for DCCF, whereby DCCF requests access tokens (for data access/collection) from NRF on behalf of the Data Consumers. NRF provides the token to DCCF if the consumers are authorized to collect the requested data, then DCCF coordinates the request in the messaging framework accordingly.

For one DCCF service request, however, two access token requests need to be sent to the NRF: one by the Data Consumer (also referred to as "consumer") for access to the DCCF service, and one by DCCF for access to the data on behalf of the consumer. Furthermore, the two access tokens need to be signed by the NRF and then verified, one by the Data Source or DCCF and the other by DCCF. All of this requires excessive token generation and verification, as well as increased signaling and workload for NRF.

Embodiments of the present disclosure address these and other problems, issues, and/or difficulties by providing novel, flexible, and efficient techniques for data collection authorization when DCCF is used. These techniques reduce the number of tokens generated and the amount of signaling and workload for NRF.

In some embodiments, when the consumer requests a first token for the DCCF service request, the consumer can also request a second token for a data collection request. Instead of providing multiple tokens as requested, NRF provides a single token that includes all authorization request results, i.e., for DCCF service request and data collection request(s). In other embodiments, instead of requesting tokens on behalf of the consumer, the DCCF can directly check the authorization. These embodiments are described in more detail below.

Figure 6:
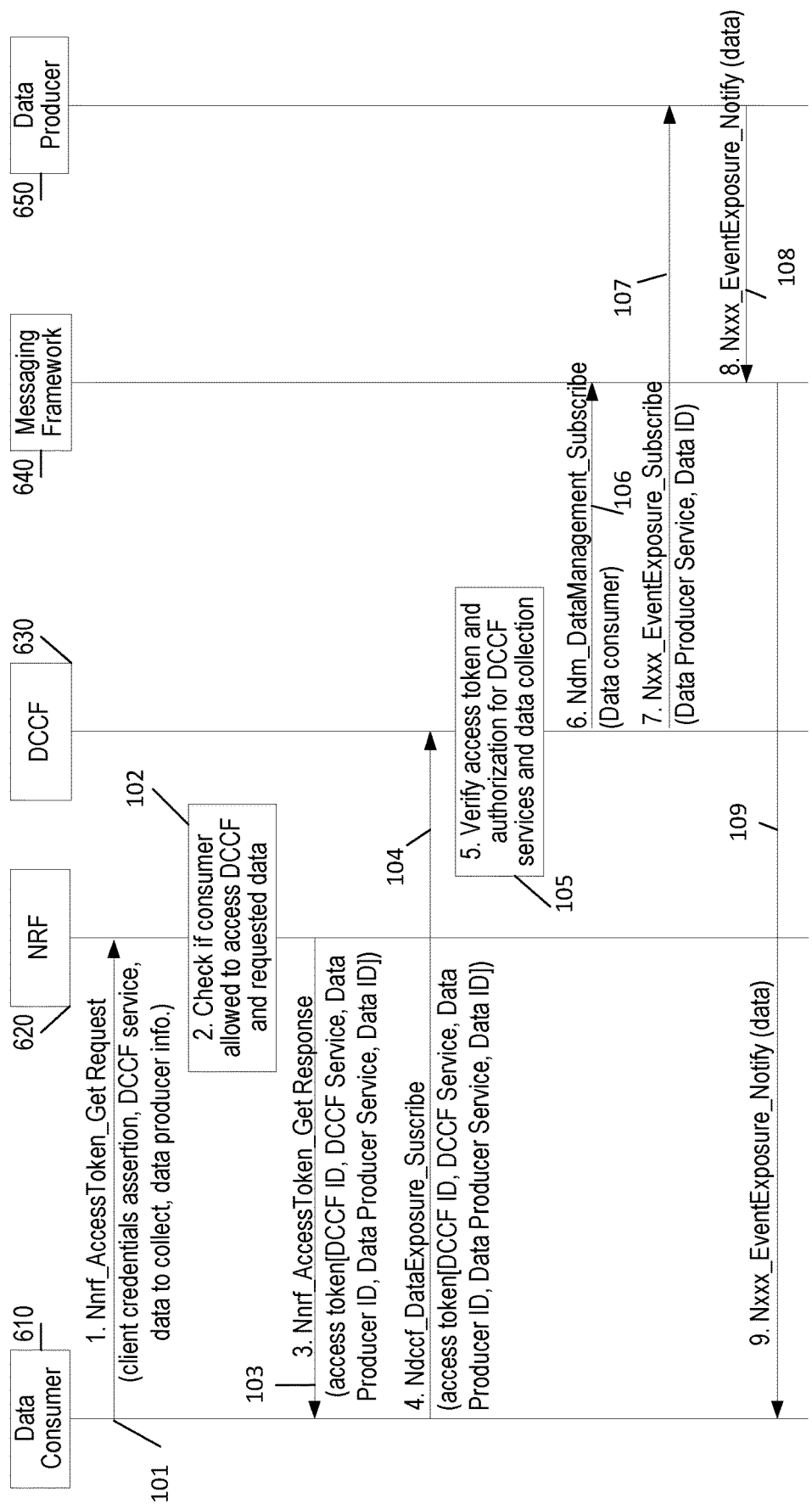
FIGS. 6-7 are flow diagrams of two exemplary procedures for a Data Consumer NF to obtain data from a Data Producer NF in a 5G network via a data collection coordination function (DCCF), according to various exemplary embodiments of the present disclosure.

FIG. 6 is a flow diagram of an exemplary procedure for a Data Consumer NF to obtain data from a Data Producer NF in a 5G network via a DCCF, according to some embodiments of the present disclosure. In particular, the procedure in FIG. 6 involves a Data Consumer (610), an NRF (620), a DCCF (630), a Messaging Framework (640), and a Data Producer (650). For convenience, these elements and/or functions will be referred to in the following description without their respective reference numbers. Although the operations in FIG. 6 are given numerical labels, this is meant to facilitate explanation rather to imply any strict ordering of the operations, unless specifically noted to the contrary.

In operation 1 of FIG. 6 (also called operation 101), the Data Consumer 610 sends an Nnrf_Access_Token_GetRequest message to the NRF 620 to obtain an access token for the DCCF service and for data collection. In the message, the Data Consumer 610 includes a name or identifier of the DCCF service, information about (e.g., identifier of) data to be collected, and any available information about the Data Producer (e.g., service, NF instance ID, etc.). In operation 2 of FIG. 6 (also called operation 102), the NRF 620 verifies that the Data Consumer 610 is allowed to access the DCCF service and also that the Data Consumer is allowed to collect the identified data. If the received request does not identify the Data Producer, the NRF 620 may identify a Data Producer (e.g., 650) that can provide the identified data to the Data Consumer and/or that the Data Consumer is authorized to access. If successful, the NRF generates an access token that includes the following information:

DCCF ID;
name (or ID) of DCCF service (e.g., Ndccf_DataExposure_Subscribe);
Data Producer ID;
name (or ID) of Data Producer service; and
identifier of the data to be collected.

In operation 3 of FIG. 6 (also called operation 103), the NRF sends the access token with the above information to the Data Consumer 610. In operation 4 of FIG. 6 (also called operation 104), the Data Consumer sends the received access token to the DCCF 630 in the service request, i.e., Ndccf_DataExposure_Subscribe. In operation 5 of FIG. 6 (also called operation 105), the DCCF verifies the access token and checks the authorization result. If the access token indicated both that the Data Consumer is allowed to get services from DCCF and that the Data Consumer is allowed to collect the identified data, the DCCF coordinates the data collection request via the messaging framework (operations 6-7 of FIG. 6, also called operations 105-106). The DCCF may cache token for future use.

In operation 8 of FIG. 6 (also called operation 108), the Data Producer 650 sends an Nxxx_EventExposure_Notify messagemessage with the requested data to the Messaging Framework 640. Since the DCCF has subscribed the Data Consumer to receive this data from the Messaging Framework (operation 6 of FIG. 6, also called operation 106), the Messaging Framework forwards the data to the Data consumer in operation 9 of FIG. 6 (also called operation 109).

In a variant of the embodiments illustrated in FIG. 6, not depicted in the drawings, the Data Consumer can request separate access tokens for the DCCF service and for the data collection requests (operation 1). The NRF generates the two tokens (operation 2) and sends them to the consumer (operation 3). A first token states that the Data Consumer can access the DCCF service and a second tokens state that the Data Consumer can consume the identified data from a specific Data Producer NF instance (if such exists).

Upon receiving the two tokens (operation 4), the DCCF verifies the tokens and checks the authorization result (operation 5) and, if the consumer is allowed to get services from the DCCF and access data, the DCCF coordinates the data collection request via the messaging framework (operations 6-7). In this variant, however, the DCCF does not send the second token to the Data Producer. Instead, the DCCF verifies the second token.

Figure 7:
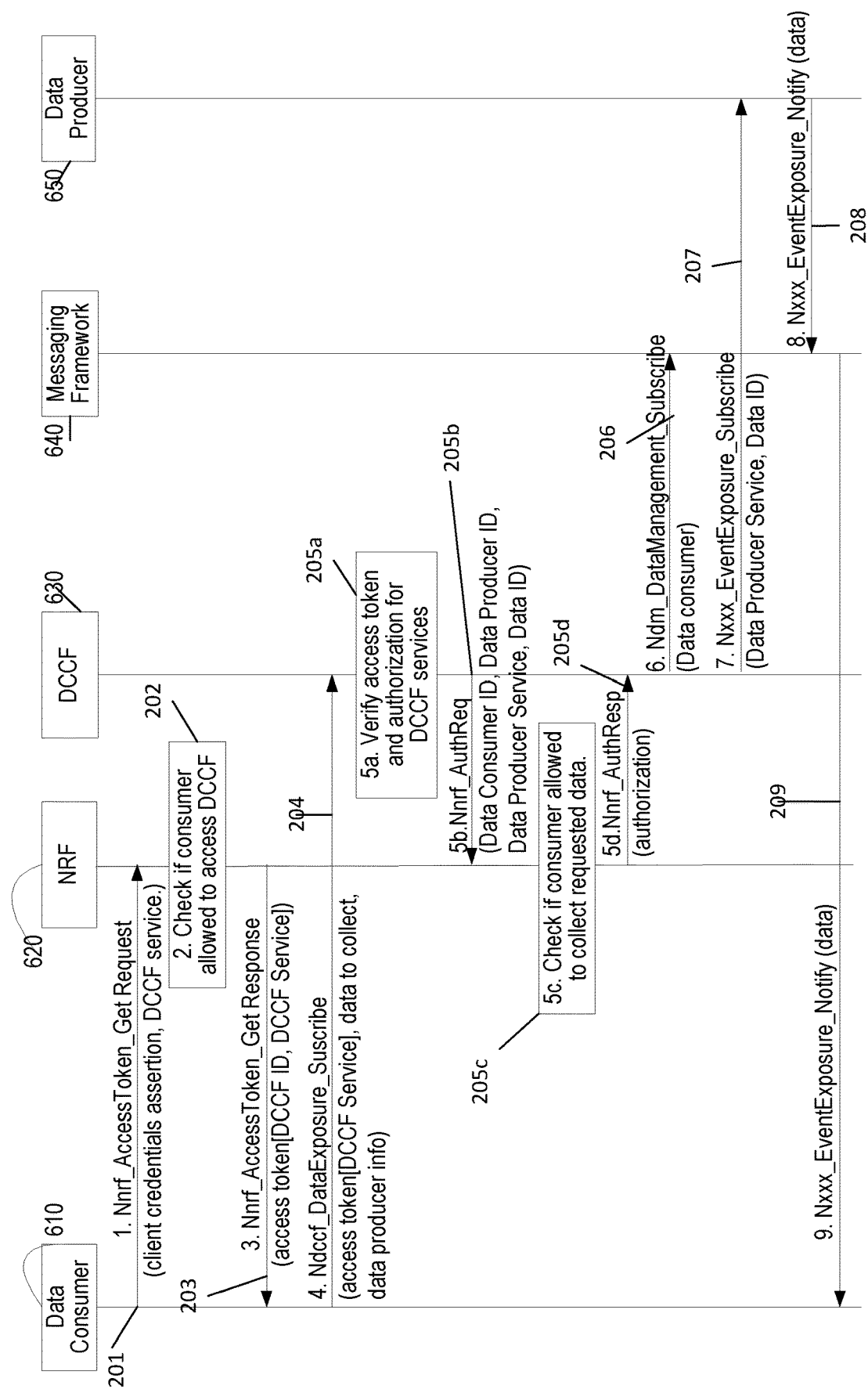

FIG. 7 is a flow diagram of another exemplary procedure for a Data Consumer NF to obtain data from a Data Producer NF in a 5G network via a DCCF, according to other embodiments of the present disclosure. The procedure in FIG. 7 involves the same elements and/or functions as in FIG. 6, which are given the same reference numbers (omitted in the following description for convenience). Although the operations in FIG. 7 are given numerical labels, this is meant to facilitate explanation rather to imply any strict ordering of the operations, unless specifically noted to the contrary.

In operation 1 of FIG. 7 (also called operation 201), the Data Consumer sends an Nnrf_Access_Token_GetRequest message to the NRF to obtain an access token for the Service provided by the DCCF. In the message, the Data Consumer includes an identifier of the Service provided by the DCCF. In operation 2 of FIG. 7 (also called operation 202), the NRF verifies that the Data Consumer is allowed to access the Service provided by the DCCF. The NRF may also verify that the Data Consumer is allowed to collect the identified data. If the received request does not identify the Data Producer, the NRF may identify a Data Producer (e.g., 650) that can provide the identified data to the Data Consumer and/or that the Data Consumer is authorized to access. If successful, the NRF generates an access token that includes a DCCF ID and the name (or ID) of the Service provided by the DCCF (e.g., Ndccf_DataExposure_Subscribe) and sends it to the Data Consumer (operation 3 of FIG. 7, also called operation 203).

In operation 4 of FIG. 7 (also called operation 204), the Data Consumer sends the received access token to the DCCF in the service request, i.e., Ndccf_DataExposure_ Subscribe. The Data Consumer also includes information about data to be collected and any available information about the Data Producer (e.g., service, NF instance ID, etc.).

In operation 5a of FIG. 7 (also called operation 205a), the DCCF verifies the access token and checks the authorization result. If the access token indicates that the Data Consumer is allowed to get services from DCCF, the DCCF then determines whether the Data Consumer is allowed to collect the identified data. If the received request does not identify the Data Producer, the NRF may identify a Data Producer (e.g., 650) that can provide the identified data to the Data Consumer. In operation 5b of FIG. 7 (also called operation 205b), the DCCF sends an authorization request to the NRF and includes the following information:

Data Consumer ID;
Data Producer ID;
name (or ID) of Data Producer service; and
identifier of the data to be collected.

In operation 5c of FIG. 7 (also called operation 205c), the NRF checks whether the Data Consumer is allowed to collect the requested data. In operation 5d of FIG. 7 (also called operation 205d), the NRF responds to the DCCF with the authorization result. If the Data Consumer is authorized, the DCCF proceeds with subsequent operations 206, 207, 208, 209 shown in FIG. 7 (identical to operations 106-109 of FIG. 6).

Figure 8:
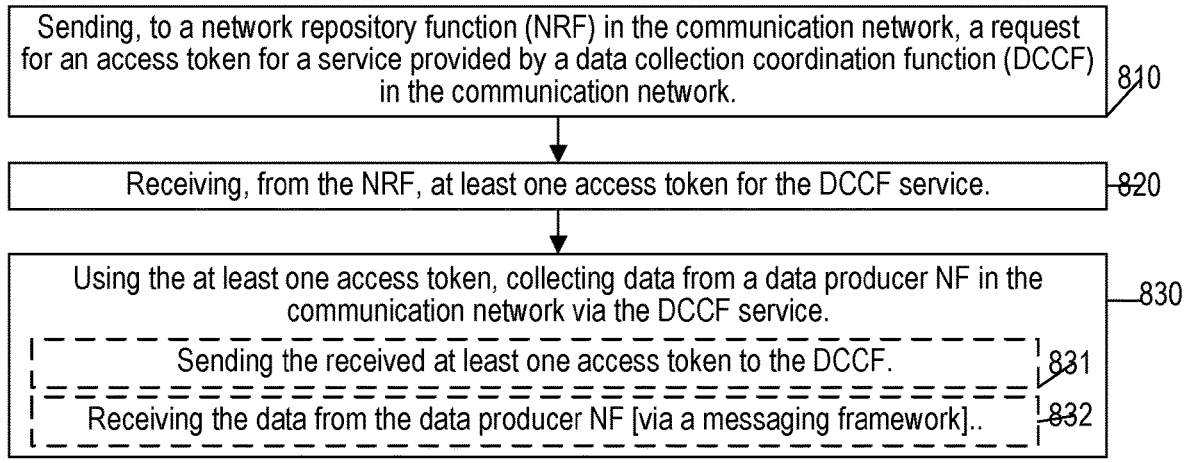
FIG. 8 shows an exemplary method (e.g., procedure) for a data consumer network function (NF) in a communication network, according to various exemplary embodiments of the present disclosure.
Figure 9:
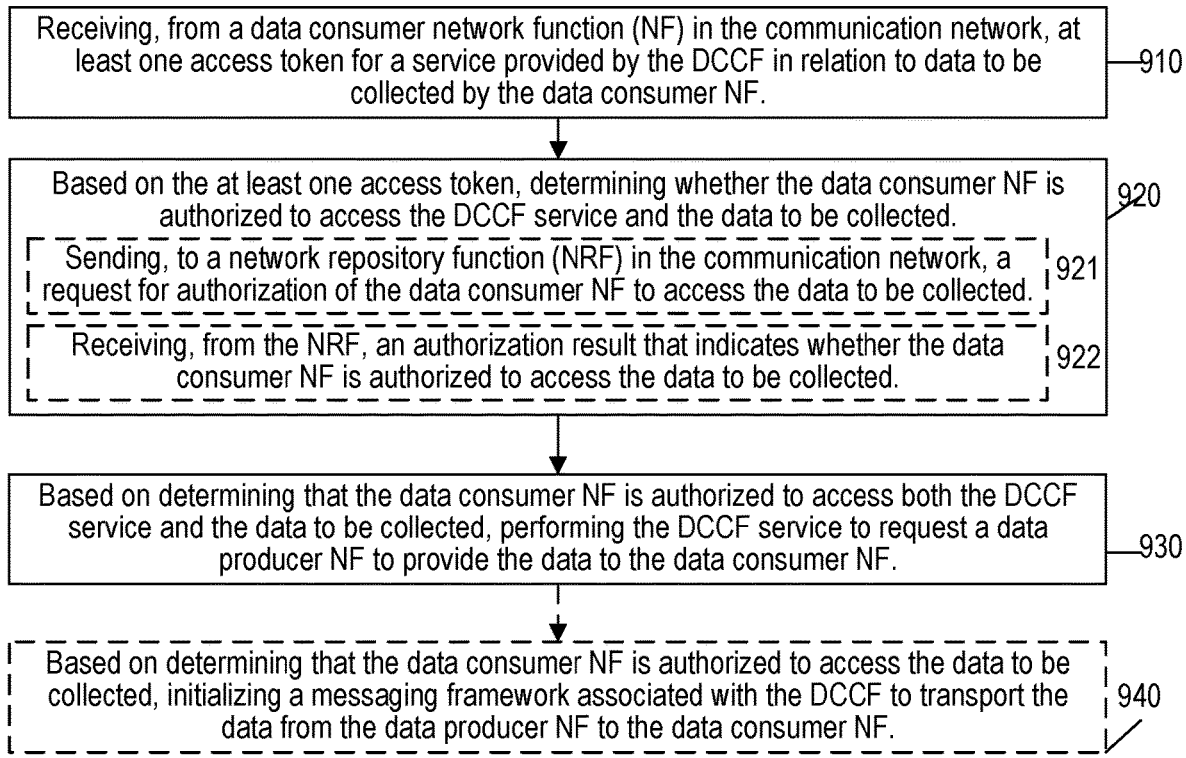
FIG. 9 shows an exemplary method (e.g., procedure) for a data collection coordination function (DCCF) in a communication network, according to various exemplary embodiments of the present disclosure.
Figure 10:
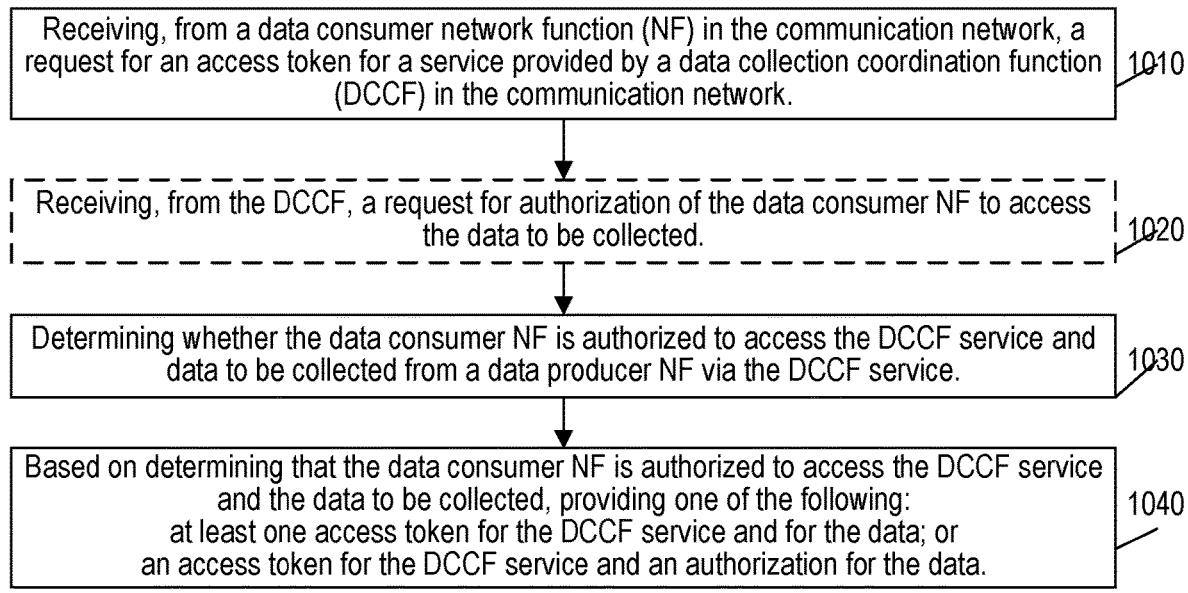
FIG. 10 shows an exemplary method (e.g., procedure) for a network repository function (NRF) in a communication network, according to various exemplary embodiments of the present disclosure.

These embodiments described above can be further illustrated with reference to FIGS. 8-10, which depict exemplary methods (e.g., procedures) for a data consumer NF, a DCCF, and an NRF, respectively. Put differently, various features of the operations described below correspond to various embodiments described above. The exemplary methods shown in FIGS. 8-10 can be used cooperatively (e.g., with each other and with other procedures described herein) to provide benefits, advantages, and/or solutions to problems described herein. Although the exemplary methods are illustrated in FIGS. 8-10 by specific blocks in particular orders, the operations corresponding to the blocks can be performed in different orders than shown and can be combined and/or divided into blocks and/or operations having different functionality than shown. Optional blocks and/or operations are indicated by dashed lines.

More specifically, FIG. 8 illustrates an exemplary method (e.g., procedure) for a data consumer network function (NF), of a communication network (e.g., 5GC), according to various exemplary embodiments of the present disclosure. The exemplary method shown in FIG. 8 can be performed by various NFs and/or network nodes described herein with reference to other figures herein.

The exemplary method can include the operations of block 810, where the data consumer NF can send, to a network repository function (NRF) in the communication network, a request for an access token for a service provided by a data collection coordination function (DCCF) in the communication network. The exemplary method can also include the operations of block 820, where the data consumer NF can receive, from the NRF, at least one access token for the DCCF service. The exemplary method can also include the operations of block 830, where the data consumer NF can, using the at least one access token, collect data from a data producer NF in the communication network via the DCCF service.

In some embodiments, the collecting operations of block 830 can include the operations of sub-blocks 831-832, where the data consumer NF can send the received at least one access token to the DCCF and receive the data from the data producer NF. In some embodiments, the data can be received from the data producer NF via a messaging framework associated with the DCCF (e.g., as illustrated in FIGS. 3 and 6-7).

In various embodiments, the request for the access token (e.g., in block 810) can include a name or identifier of the DCCF service. In some of these embodiments, a single access token can be received from the NRF (e.g., in block 820) and includes an identifier of the DCCF and an identifier of the DCCF service. In such embodiments, the single access token can be sent to the DCCF (e.g., in block 830) together with an identifier of data to be collected and information about a producer of the data to be collected. FIG. 7 illustrates an example of these embodiments.

In other of these embodiments, the request for the access token can also include an identifier of data to be collected and/or information about a producer of the data to be collected. In such embodiments, a single access token can be received from the NRF (e.g., in block 820) and sent to the DCCF (e.g., in block 830). In such case, the single access token can include:

an identifier of the DCCF;
an identifier of the DCCF service;
an identifier of the data producer NF;
an identifier of the data producer service; and
an identifier of the data to be collected.

FIG. 6 illustrates an example of these embodiments.

In a variant of these embodiments, first and second access tokens can be received from the NRF (e.g., in block 820) and sent to the DCCF (e.g., in block 830). In such case, the first access token can include an identifier of the DCCF and an identifier of the DCCF service. Likewise, the second access token can include an identifier of the data producer NF, an identifier of the data procedure service, and an identifier of the data to be collected.

In addition, FIG. 9 illustrates an exemplary method (e.g., procedure) for a data collection coordination function (DCCF) of a communication network (e.g., 5GC), according to various exemplary embodiments of the present disclosure. The exemplary method shown in FIG. 9 can be performed by an NRF as shown and/or described in relation to other figures herein.

The exemplary method can include the operations of block 910, where the DCCF can receive, from a data consumer network function (NF) in the communication network, at least one access token for a service provided by the DCCF in relation to data to be collected by the data consumer NF. The exemplary method can also include the operations of block 920, where the DCCF can, based on the at least one access token, determine whether the data consumer NF is authorized to access the DCCF service and the data to be collected. The operations of block 920 can be distinct operations, i.e., the DCCF can determine whether the data consumer NF is authorized to access the DCCF service and whether the data consumer NF is authorized to access the data to be collected in two different operations. The exemplary method can also include the operations of block 930, where the DCCF can, based on determining that the data consumer NF is authorized to access both the DCCF service and the data to be collected, perform the DCCF service to request a data producer NF to provide the data to the data consumer NF.

In some embodiments, a single access token can be received from the data consumer NF (e.g., in block 910) and includes an identifier of the DCCF and an identifier of the DCCF service. In such embodiments, the single access token can be received together with an identifier of data to be collected and/or information about a producer of the data to be collected. FIG. 7 illustrates an example of these embodiments.

In these embodiments, the determining operations in block 920 can include the operations of sub-blocks 921-922. In sub-block 921, the DCCF can send, to a network repository function (NRF) in the communication network, a request for authorization of the data consumer NF to access the data to be collected. For example, the request for authorization can include identifiers of the data consumer NF, the data producer NF, the data procedure service, and the data to be collected. In sub-block 922, the DCCF can receive, from the NRF, an authorization result that indicates whether the data consumer NF is authorized to access the data to be collected. In other embodiments, a single access token can be received from the data consumer NF (e.g., in block 910) and can include:
   an identifier of the DCCF;
   an identifier of the DCCF service;
   an identifier of the data producer NF;
   an identifier of the data procedure service; and
   an identifier of the data to be collected.
FIG. 6 illustrates an example of these embodiments.

In a variant of these embodiments, first and second access tokens can be received from the data consumer NF (e.g., in block 910). In such case, the first access token can include an identifier of the DCCF and an identifier of the DCCF service. Likewise, the second access token can include identifiers of the data producer NF, the data procedure service, and the data to be collected. In this variant, determining whether the data consumer NF is authorized to access the data to be collected (e.g., block 920) can be performed by the DCCF without sending the second access token to the data producer NF.

In some embodiments, the exemplary method can also include the operations of block 940, where the DCCF can, based on determining that the data consumer NF is authorized to access the data to be collected (e.g., in block 920), initialize a messaging framework associated with the DCCF to transport the data from the data producer NF to the data consumer NF.

In addition, FIG. 10 illustrates an exemplary method (e.g., procedure) for a network repository function (NRF) of a communication network (e.g., 5GC), according to various exemplary embodiments of the present disclosure. The exemplary method shown in FIG. 10 can be performed by an NRF as shown and/or described in relation to other figures herein.

The exemplary method can include the operations of block 1010, where the NRF can receive, from a data consumer network function (NF) in the communication network, a request for an access token for a service provided by a data collection coordination function (DCCF) in the communication network. The exemplary method can also include the operations of block 1030, where the NRF can determine whether the data consumer NF is authorized to access the DCCF service and data to be collected from a data producer NF via the DCCF service. The exemplary method can also include the operations of block 1040, where the NRF can, based on determining that the data consumer NF is authorized to access the DCCF service and the data to be collected, provide one of the following:
   at least one access token for the DCCF service and for the data; or
   an access token for the DCCF service and an authorization for the data.

In various embodiments, the request for the access token (e.g., in block 1010) can include a name or identifier of the DCCF service. In some of these embodiments, a single access token can be provided to the data consumer NF (e.g., in block 1040) and includes an identifier of the DCCF and an identifier of the DCCF service. In such embodiments, the exemplary method can also include the operations of block 1020, where the NRF can receive, from the DCCF, a request for authorization of the data consumer NF to access the data to be collected. In such case, the authorization for the data can be provided to the DCCF in response to the request. FIG. 7 illustrates an example of these embodiments.

In other of these embodiments, the request for the access token can also include an identifier of data to be collected and/or information about a producer of the data to be collected. In such embodiments, a single access token for the DCCF service and the data can be provided to the data consumer NF (e.g., in block 1040). In such case, the single access token can include:
   an identifier of the DCCF;
   an identifier of the DCCF service;
   an identifier of the data producer NF;
   an identifier of the data procedure service; and
   an identifier of the data to be collected.
FIG. 6 illustrates an example of these embodiments.

In a variant of these embodiments, first and second access tokens can be provided to the data consumer NF (e.g., in block 1040). In such case, the first access token can be for the DCCF service and can include an identifier of the DCCF and an identifier of the DCCF service. Likewise, the second access token can be for the data and can include identifiers of the data producer NF, the data procedure service, and the data to be collected. In a further variant, first and second access token can be provided to the data consumer NF and to the DCCF, respectively. In such case, the first access token can be for the Service provided by the DCCF and can include an identifier of the DCCF and an identifier of the Service provided by the DCCF. Likewise, the second access token can be for the data and can include identifiers of the data producer NF, the data producer NF service, and the data to be collected.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 11:
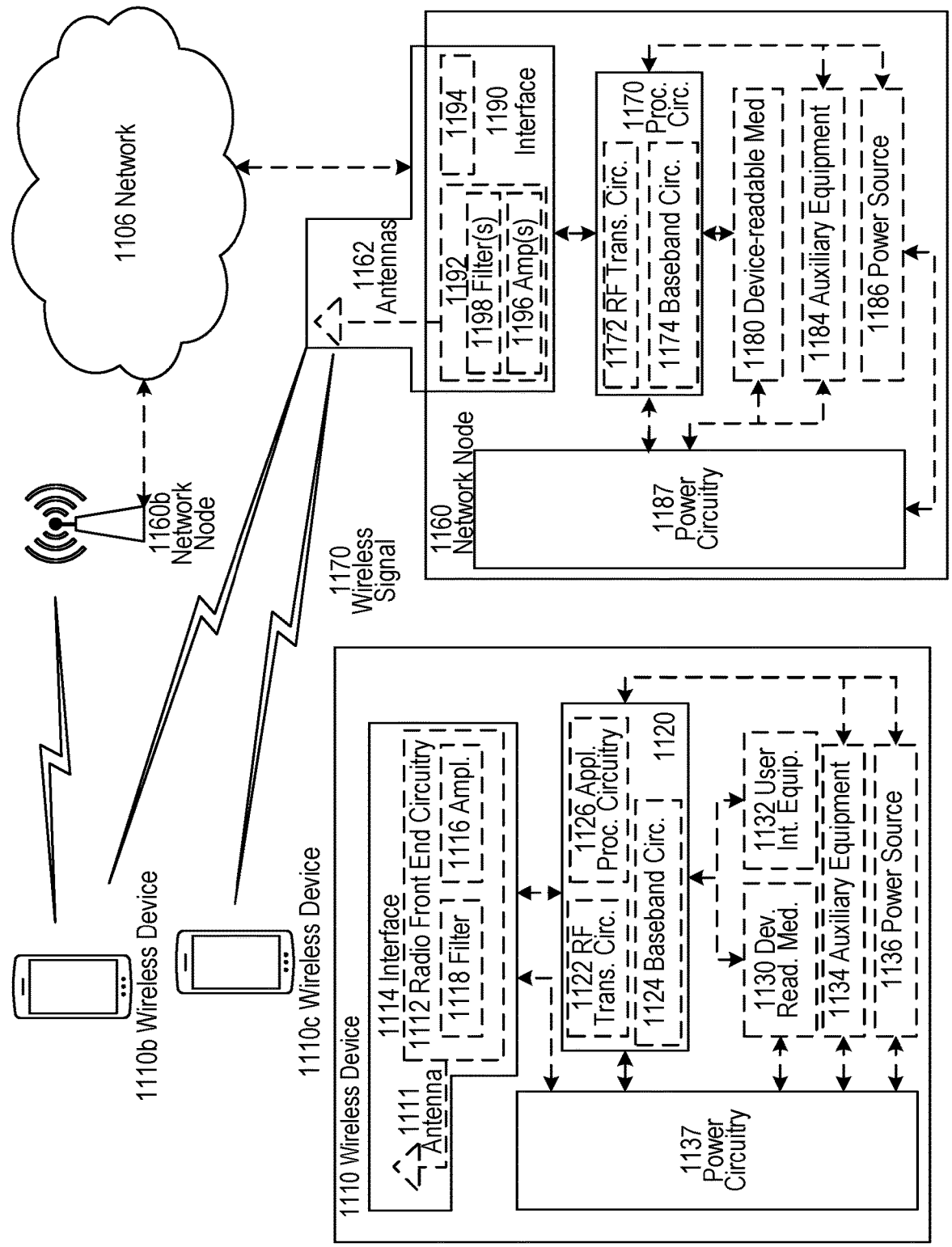
FIG. 11 illustrates a wireless network, according to various exemplary embodiments of the present disclosure.

For example, FIG. 11 shows an exemplary wireless network in which various embodiments disclosed herein can be implemented. For simplicity, the wireless network of FIG. 11 only depicts network 1106, network nodes 1160 and 1160b, and WDs 1110, 1110b, and 1110c. In practice, a wireless network can further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1160 are depicted as single boxes located within a larger box, or nested within multiple boxes, in practice, a network node can comprise multiple different physical components that make up a single illustrated component (e.g., device readable medium 1180 can comprise multiple separate hard drives as well as multiple RAM modules).

Similarly, network node 1160 can be composed of multiple physically separate components (e.g., a NodeB component and an RNC component, or a BTS component and a BSC component, etc.), which can each have their own respective components. In certain scenarios in which network node 1160 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1160 can be configured to support multiple radio access technologies (RATs). In such embodiments, some components can be duplicated (e.g., separate device readable medium 1180 for the different RATs) and some components can be reused (e.g., the same antenna 1162 can be shared by the RATs). Network node 1160 can also include multiple sets of the various illustrated components for different wireless technologies integrated into network node 1160, such as, for example, GSM, WCDMA, LTE, NR, WiFi, or Bluetooth wireless technologies. These wireless technologies can be integrated into the same or different chip or set of chips and other components within network node 1160.

Processing circuitry 1170 can be configured to perform any determining, calculating, or similar operations (e.g., certain obtaining operations) described herein as being provided by a network node. These operations performed by processing circuitry 1170 can include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1160, either alone or in conjunction with other network node 1160 components (e.g., device readable medium 1180). Such functionality can include any of the various wireless features, functions, or benefits discussed herein.

For example, processing circuitry 1170 can execute instructions stored in device readable medium 1180 or in memory within processing circuitry 1170. In some embodiments, processing circuitry 1170 can include a system on a chip (SOC). As a more specific example, instructions (also referred to as a computer program product) stored in medium 1180 can include instructions that, when executed by processing circuitry 1170, can configure network node 1160 to perform operations corresponding to various exemplary methods (e.g., procedures) described herein.

In some embodiments, processing circuitry 1170 can include one or more of radio frequency (RF) transceiver circuitry 1172 and baseband processing circuitry 1174. In some embodiments, radio frequency (RF) transceiver circuitry 1172 and baseband processing circuitry 1174 can be on separate chips (or sets of chips), boards, or units, such as radio units and digital units. In alternative embodiments, part or all of RF transceiver circuitry 1172 and baseband processing circuitry 1174 can be on the same chip or set of chips, boards, or units In certain embodiments, some or all of the functionality described herein as being provided by a network node, base station, eNB or other such network device can be performed by processing circuitry 1170 executing instructions stored on device readable medium 1180 or memory within processing circuitry 1170. In alternative embodiments, some or all of the functionality can be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160 but are enjoyed by network node 1160 as a whole, and/or by end users and the wireless network generally.

Device readable medium 1180 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1170. Device readable medium 1180 can store any suitable instructions, data or information, including a computer program, software, an application including one or more of logic, rules, code, tables, etc. and/or other instructions capable of being executed by processing circuitry 1170 and, utilized by network node 1160. Device readable medium 1180 can be used to store any calculations made by processing circuitry 1170 and/or any data received via interface 1190. In some embodiments, processing circuitry 1170 and device readable medium 1180 can be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that can be coupled to, or in certain embodiments a part of, antenna 1162. Radio front end circuitry 1192 comprises filters 1198 and amplifiers 1196. Radio front end circuitry 1192 can be connected to antenna 1162 and processing circuitry 1170. Radio front end circuitry can be configured to condition signals communicated between antenna 1162 and processing circuitry 1170. Radio front end circuitry 1192 can receive digital data that is to be sent out to other network nodes or WDs via a wireless connection. Radio front end circuitry 1192 can convert the digital data into a radio signal having the appropriate channel and bandwidth parameters using a combination of filters 1198 and/or amplifiers 1196. The radio signal can then be transmitted via antenna 1162. Similarly, when receiving data, antenna 1162 can collect radio signals which are then converted into digital data by radio front end circuitry 1192. The digital data can be passed to processing circuitry 1170. In other embodiments, the interface can comprise different components and/or different combinations of components.

In certain alternative embodiments, network node 1160 may not include separate radio front end circuitry 1192, instead, processing circuitry 1170 can comprise radio front end circuitry and can be connected to antenna 1162 without separate radio front end circuitry 1192. Similarly, in some embodiments, all or some of RF transceiver circuitry 1172 can be considered a part of interface 1190. In still other embodiments, interface 1190 can include one or more ports or terminals 1194, radio front end circuitry 1192, and RF transceiver circuitry 1172, as part of a radio unit (not shown), and interface 1190 can communicate with baseband processing circuitry 1174, which is part of a digital unit (not shown).

Antenna 1162 can include one or more antennas, or antenna arrays, configured to send and/or receive wireless signals. Antenna 1162 can be coupled to radio front end circuitry 1190 and can be any type of antenna capable of transmitting and receiving data and/or signals wirelessly. In some embodiments, antenna 1162 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1162 can be separate from network node 1160 and can be connectable to network node 1160 through an interface or port.

Antenna 1162, interface 1190, and/or processing circuitry 1170 can be configured to perform any receiving operations and/or certain obtaining operations described herein as being performed by a network node. Any information, data and/or signals can be received from a wireless device, another network node and/or any other network equipment. Similarly, antenna 1162, interface 1190, and/or processing circuitry 1170 can be configured to perform any transmitting operations described herein as being performed by a network node. Any information, data and/or signals can be transmitted to a wireless device, another network node and/or any other network equipment.

Power circuitry 1187 can comprise, or be coupled to, power management circuitry and can be configured to supply the components of network node 1160 with power for performing the functionality described herein. Power circuitry 1187 can receive power from power source 1186. Power source 1186 and/or power circuitry 1187 can be configured to provide power to the various components of network node 1160 in a form suitable for the respective components (e.g., at a voltage and current level needed for each respective component). Power source 1186 can either be included in, or external to, power circuitry 1187 and/or network node 1160. For example, network node 1160 can be connectable to an external power source (e.g., an electricity outlet) via an input circuitry or interface such as an electrical cable, whereby the external power source supplies power to power circuitry 1187. As a further example, power source 1186 can comprise a source of power in the form of a battery or battery pack which is connected to, or integrated in, power circuitry 1187. The battery can provide backup power should the external power source fail. Other types of power sources, such as photovoltaic devices, can also be used.

Alternative embodiments of network node 1160 can include additional components beyond those shown in FIG. 11 that can be responsible for providing certain aspects of the network node's functionality, including any of the functionality described herein and/or any functionality necessary to support the subject matter described herein. For example, network node 1160 can include user interface equipment to allow and/or facilitate input of information into network node 1160 and to allow and/or facilitate output of information from network node 1160. This can allow and/or facilitate a user to perform diagnostic, maintenance, repair, and other administrative functions for network node 1160.

In some embodiments, a wireless device (WD, e.g., WD 1110) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 can include multiple sets of one or more of the illustrated components for different wireless technologies supported by WD 1110, such as, for example, GSM, WCDMA, LTE, NR, WiFi, WiMAX, or Bluetooth wireless technologies, just to mention a few. These wireless technologies can be integrated into the same or different chips or set of chips as other components within WD 1110.

Antenna 1111 can include one or more antennas or antenna arrays, configured to send and/or receive wireless signals, and is connected to interface 1114. In certain alternative embodiments, antenna 1111 can be separate from WD 1110 and be connectable to WD 1110 through an interface or port. Antenna 1111, interface 1114, and/or processing circuitry 1120 can be configured to perform any receiving or transmitting operations described herein as being performed by a WD. Any information, data and/or signals can be received from a network node and/or another WD. In some embodiments, radio front end circuitry and/or antenna 1111 can be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120 and can be configured to condition signals communicated between antenna 1111 and processing circuitry ix) 1120. Radio front end circuitry 1112 can be coupled to or a part of antenna 1111. In some embodiments, WD 1110 may not include separate radio front end circuitry 1112; rather, processing circuitry 1120 can comprise radio front end circuitry and can be connected to antenna 1111. Similarly, in some embodiments, some or all of RF transceiver circuitry 1122 can be considered a part of interface 1114. Radio front end circuitry 1112 can receive digital data that is to be sent out to other network nodes or WDs via a wireless connection. Radio front end circuitry 1112 can convert the digital data into a radio signal having the appropriate channel and bandwidth parameters using a combination of filters 1118 and/or amplifiers 1116. The radio signal can then be transmitted via antenna 1111. Similarly, when receiving data, antenna 1111 can collect radio signals which are then converted into digital data by radio front end circuitry 1112. The digital data can be passed to processing circuitry 1120. In other embodiments, the interface can comprise different components and/or different combinations of components.

Processing circuitry 1120 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1110 functionality either alone or in combination with other WD 1110 components, such as device readable medium 1130. Such functionality can include any of the various wireless features or benefits discussed herein.

For example, processing circuitry 1120 can execute instructions stored in device readable medium 1130 or in memory within processing circuitry 1120 to provide the functionality disclosed herein. More specifically, instructions (also referred to as a computer program product) stored in medium 1130 can include instructions that, when executed by processor 1120, can configure wireless device 1110 to perform operations corresponding to various exemplary methods (e.g., procedures) described herein.

As illustrated, processing circuitry 1120 includes one or more of RF transceiver circuitry 1122, baseband processing circuitry 1124, and application processing circuitry 1126. In other embodiments, the processing circuitry can comprise different components and/or different combinations of components. In certain embodiments processing circuitry 1120 of WD 1110 can comprise a SOC. In some embodiments, RF transceiver circuitry 1122, baseband processing circuitry 1124, and application processing circuitry 1126 can be on separate chips or sets of chips. In alternative embodiments, part or all of baseband processing circuitry 1124 and application processing circuitry 1126 can be combined into one chip or set of chips, and RF transceiver circuitry 1122 can be on a separate chip or set of chips. In still alternative embodiments, part or all of RF transceiver circuitry 1122 and baseband processing circuitry 1124 can be on the same chip or set of chips, and application processing circuitry 1126 can be on a separate chip or set of chips. In yet other alternative embodiments, part or all of RF transceiver circuitry 1122, baseband processing circuitry 1124, and application processing circuitry 1126 can be combined in the same chip or set of chips. In some embodiments, RF transceiver circuitry 1122 can be a part of interface 1114. RF transceiver circuitry 1122 can condition RF signals for processing circuitry 1120.

In certain embodiments, some or all of the functionality described herein as being performed by a WD can be provided by processing circuitry 1120 executing instructions stored on device readable medium 1130, which in certain embodiments can be a computer-readable storage medium. In alternative embodiments, some or all of the functionality can be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 can be configured to perform any determining, calculating, or similar operations (e.g., certain obtaining operations) described herein as being performed by a WD. These operations, as performed by processing circuitry 1120, can include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 can be operable to store a computer program, software, an application including one or more of logic, rules, code, tables, etc. and/or other instructions capable of being executed by processing circuitry 1120. Device readable medium 1130 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1120. In some embodiments, processing circuitry 1120 and device readable medium 1130 can be considered to be integrated.

User interface equipment 1132 can include components that allow and/or facilitate a human user to interact with WD 1110. Such interaction can be of many forms, such as visual, audial, tactile, etc. User interface equipment 1132 can be operable to produce output to the user and to allow and/or facilitate the user to provide input to WD 1110. The type of interaction can vary depending on the type of user interface equipment 1132 installed in WD 1110. For example, if WD 1110 is a smart phone, the interaction can be via a touch screen; if WD 1110 is a smart meter, the interaction can be through a screen that provides usage (e.g., the number of gallons used) or a speaker that provides an audible alert (e.g., if smoke is detected). User interface equipment 1132 can include input interfaces, devices and circuits, and output interfaces, devices and circuits. User interface equipment 1132 can be configured to allow and/or facilitate input of information into WD 1110 and is connected to processing circuitry 1120 to allow and/or facilitate processing circuitry 1120 to process the input information. User interface equipment 1132 can include, for example, a microphone, a proximity or other sensor, keys/buttons, a touch display, one or more cameras, a USB port, or other input circuitry. User interface equipment 1132 is also configured to allow and/or facilitate output of information from WD 1110, and to allow and/or facilitate processing circuitry 1120 to output information from WD 1110. User interface equipment 1132 can include, for example, a speaker, a display, vibrating circuitry, a USB port, a headphone interface, or other output circuitry. Using one or more input and output interfaces, devices, and circuits, of user interface equipment 1132, WD 1110 can communicate with end users and/or the wireless network and allow and/or facilitate them to benefit from the functionality described herein.

Auxiliary equipment 1134 is operable to provide more specific functionality which may not be generally performed by WDs. This can comprise specialized sensors for doing measurements for various purposes, interfaces for additional types of communication such as wired communications etc. The inclusion and type of components of auxiliary equipment 1134 can vary depending on the embodiment and/or scenario.

Power source 1136 can, in some embodiments, be in the form of a battery or battery pack. Other types of power sources, such as an external power source (e.g., an electricity outlet), photovoltaic devices or power cells, can also be used. WD 1110 can further comprise power circuitry 1137 for delivering power from power source 1136 to the various parts of WD 1110 which need power from power source 1136 to carry out any functionality described or indicated herein. Power circuitry 1137 can in certain embodiments comprise power management circuitry. Power circuitry 1137 can additionally or alternatively be operable to receive power from an external power source; in which case WD 1110 can be connectable to the external power source (such as an electricity outlet) via input circuitry or an interface such as an electrical power cable. Power circuitry 1137 can also in certain embodiments be operable to deliver power from an external power source to power source 1136. This can be, for example, for the charging of power source 1136. Power circuitry 1137 can perform any converting or other modification to the power from power source 1136 to make it suitable for supply to the respective components of WD 1110.

Figure 12:
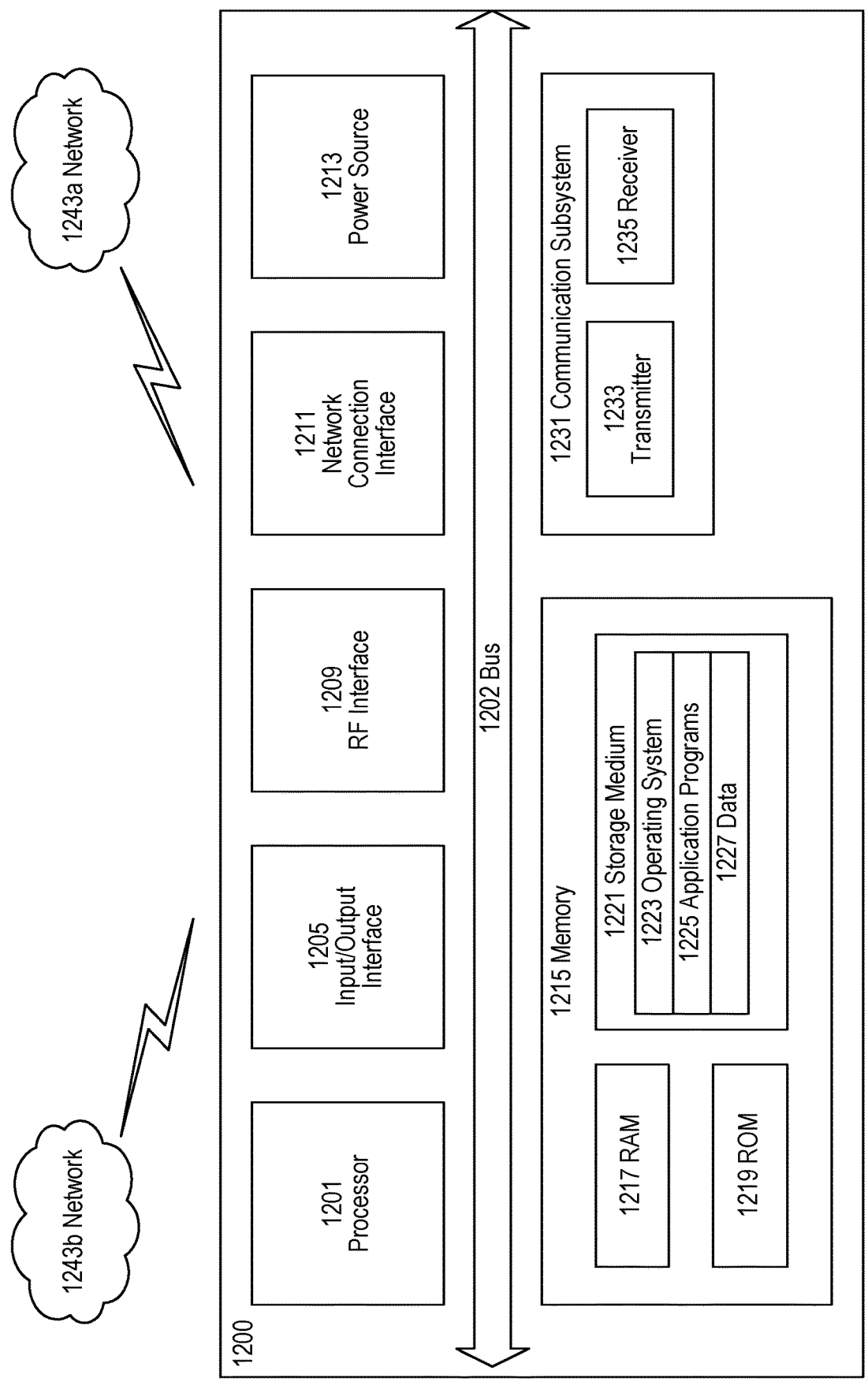
FIG. 12 shows an exemplary embodiment of a UE, in accordance with various aspects described herein.

FIG. 12 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1200 can be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the 3 rd Generation Partnership Project (3GPP), such as 3GPP's GSM, UMTS, LTE, and/or 5G standards. As mentioned previously, the term WD and UE can be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 can include other similar types of information. Certain UEs can utilize all of the components shown in FIG. 12, or only a subset of the components. The level of integration between the components can vary from one UE to another UE. Further, certain UEs can contain multiple instances of a component, such as multiple processors, memories, transceivers, transmitters, receivers, etc.

In FIG. 12, processing circuitry 1201 can be configured to process computer instructions and data. Processing circuitry 1201 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 can include two central processing units (CPUs). Data can be information in a form suitable for use by a computer.

In the depicted embodiment, input/output interface 1205 can be configured to provide a communication interface to an input device, output device, or input and output device. UE 1200 can be configured to use an output device via input/output interface 1205. An output device can use the same type of interface port as an input device. For example, a USB port can be used to provide input to and output from UE 1200. The output device can be a speaker, a sound card, a video card, a display, a monitor, a printer, an actuator, an emitter, a smartcard, another output device, or any combination thereof. UE 1200 can be configured to use an input device via input/output interface 1205 to allow and/or facilitate a user to capture information into UE 1200. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 12, RF interface 1209 can be configured to provide a communication interface to RF components such as a transmitter, a receiver, and an antenna. Network connection interface 1211 can be configured to provide a communication interface to network 1243*a*. Network 1243*a* can encompass wired and/or wireless networks such as a local-area network (LAN), a wide-area network (WAN), a computer network, a wireless network, a telecommunications network, another like network or any combination thereof. For example, network 1243*a* can comprise a Wi-Fi network. Network connection interface 1211 can be configured to include a receiver and a transmitter interface used to communicate with one or more other devices over a communication network according to one or more communication protocols, such as Ethernet, TCP/IP, SONET, ATM, or the like. Network connection interface 1211 can implement receiver and transmitter functionality appropriate to the communication network links (e.g., optical, electrical, and the like). The transmitter and receiver functions can share circuit components, software or firmware, or alternatively can be implemented separately.

RAM 1217 can be configured to interface via bus 1202 to processing circuitry 1201 to provide storage or caching of data or computer instructions during the execution of software programs such as the operating system, application programs, and device drivers. ROM 1219 can be configured to provide computer instructions or data to processing circuitry 1201. For example, ROM 1219 can be configured to store invariant low-level system code or data for basic system functions such as basic input and output (I/O), startup, or reception of keystrokes from a keyboard that are stored in a non-volatile memory. Storage medium 1221 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1221 can be configured to include operating system 1223; application program 1225 such as a web browser application, a widget or gadget engine or another application; and data file 1227. Storage medium 1221 can store, for use by UE 1200, any of a variety of various operating systems or combinations of operating systems. For example, application program 1225 can include executable program instructions (also referred to as a computer program product) that, when executed by processor 1201, can configure UE 1200 to perform operations corresponding to various exemplary methods (e.g., procedures) described herein.

Storage medium 1221 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 can allow and/or facilitate UE 1200 to access computer-executable instructions, application programs or the like, stored on transitory or non-transitory memory media, to off-load data, or to upload data. An article of manufacture, such as one utilizing a communication system can be tangibly embodied in storage medium 1221, which can comprise a device readable medium.

In FIG. 12, processing circuitry 1201 can be configured to communicate with network 1243*b* using communication subsystem 1231. Network 1243*a* and network 1243*b* can be the same network or networks or different network or networks. Communication subsystem 1231 can be configured to include one or more transceivers used to communicate with network 1243*b*. For example, communication subsystem 1231 can be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver can include transmitter 1233 and/or receiver 1235 to implement transmitter or receiver functionality, respectively, appropriate to the RAN links (e.g., frequency allocations and the like). Further, transmitter 1233 and receiver 1235 of each transceiver can share circuit components, software or firmware, or alternatively can be implemented separately.

In the illustrated embodiment, the communication functions of communication subsystem 1231 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 can include cellular communication, Wi-Fi communication, Bluetooth communication, and GPS communication. Network 1243*b* can encompass wired and/or wireless networks such as a local-area network (LAN), a wide-area network (WAN), a computer network, a wireless network, a telecommunications network, another like network or any combination thereof. For example, network 1243*b* can be a cellular network, a Wi-Fi network, and/or a near-field network. Power source 1213 can be configured to provide alternating current (AC) or direct current (DC) power to components of UE 1200.

The features, benefits and/or functions described herein can be implemented in one of the components of UE 1200 or partitioned across multiple components of UE 1200. Further, the features, benefits, and/or functions described herein can be implemented in any combination of hardware, software or firmware. In one example, communication subsystem 1231 can be configured to include any of the components described herein. Further, processing circuitry 1201 can be configured to communicate with any of such components over bus 1202. In another example, any of such components can be represented by program instructions stored in memory that when executed by processing circuitry 1201 perform the corresponding functions described herein. In another example, the functionality of any of such components can be partitioned between processing circuitry 1201 and communication subsystem 1231. In another example, the non-computationally intensive functions of any of such components can be implemented in software or firmware and the computationally intensive functions can be implemented in hardware.

Figure 13:
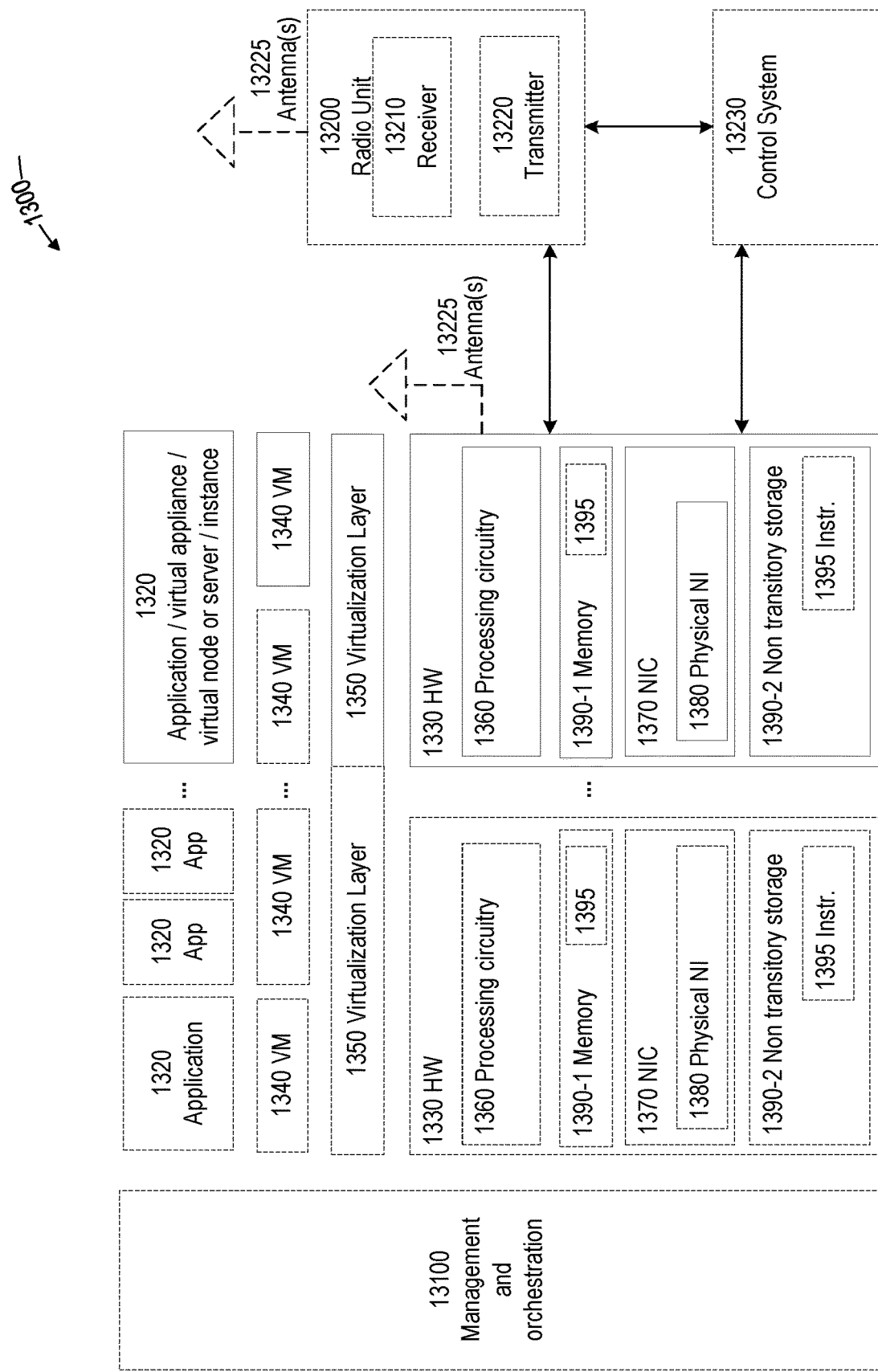
FIG. 13 is a block diagram illustrating an exemplary virtualization environment usable for implementation of various embodiments of network nodes or NFs described herein.

FIG. 13 is a schematic block diagram illustrating a virtualization environment 1300 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node can be entirely virtualized.

The functions can be implemented by one or more applications 1320 (which can alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300 can include general-purpose or special-purpose network hardware devices (or nodes) 1330 comprising a set of one or more processors or processing circuitry 1360, which can be commercial off-the-shelf (COTS) processors, dedicated Application Specific Integrated Circuits (ASICs), or any other type of processing circuitry including digital or analog hardware components or special purpose processors. Each hardware device can comprise memory 1390-1 which can be non-persistent memory for temporarily storing instructions 1395 or software executed by processing circuitry 1360. For example, instructions 1395 can include program instructions (also referred to as a computer program product) that, when executed by processing circuitry 1360, can configure hardware node 1320 to perform operations corresponding to various exemplary methods (e.g., procedures) described herein. Such operations can also be attributed to virtual node(s) 1320 that is/are hosted by hardware node 1330.

Each hardware device can comprise one or more network interface controllers (NICs) 1370, also known as network interface cards, which include physical network interface 1380. Each hardware device can also include non-transitory, persistent, machine-readable storage media 1390-2 having stored therein software 1395 and/or instructions executable by processing circuitry 1360. Software 1395 can include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and can be run by a corresponding virtualization layer 1350 or hypervisor. Different embodiments of the instance of virtual appliance 1320 can be implemented on one or more of virtual machines 1340, and the implementations can be made in different ways.

During operation, processing circuitry 1360 executes software 1395 to instantiate the hypervisor or virtualization layer 1350, which can sometimes be referred to as a virtual machine monitor (VMM). Virtualization layer 1350 can present a virtual operating platform that appears like networking hardware to virtual machine 1340.

As shown in FIG. 13, hardware 1330 can be a standalone network node with generic or specific components. Hardware 1330 can comprise antenna 13225 and can implement some functions via virtualization. Alternatively, hardware 1330 can be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1340 can be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 can be coupled to one or more antennas 13225. Radio units 13200 can communicate directly with hardware nodes 1330 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 13230, which can alternatively be used for communication between the hardware nodes 1330 and radio units 13200.

Figure 14:
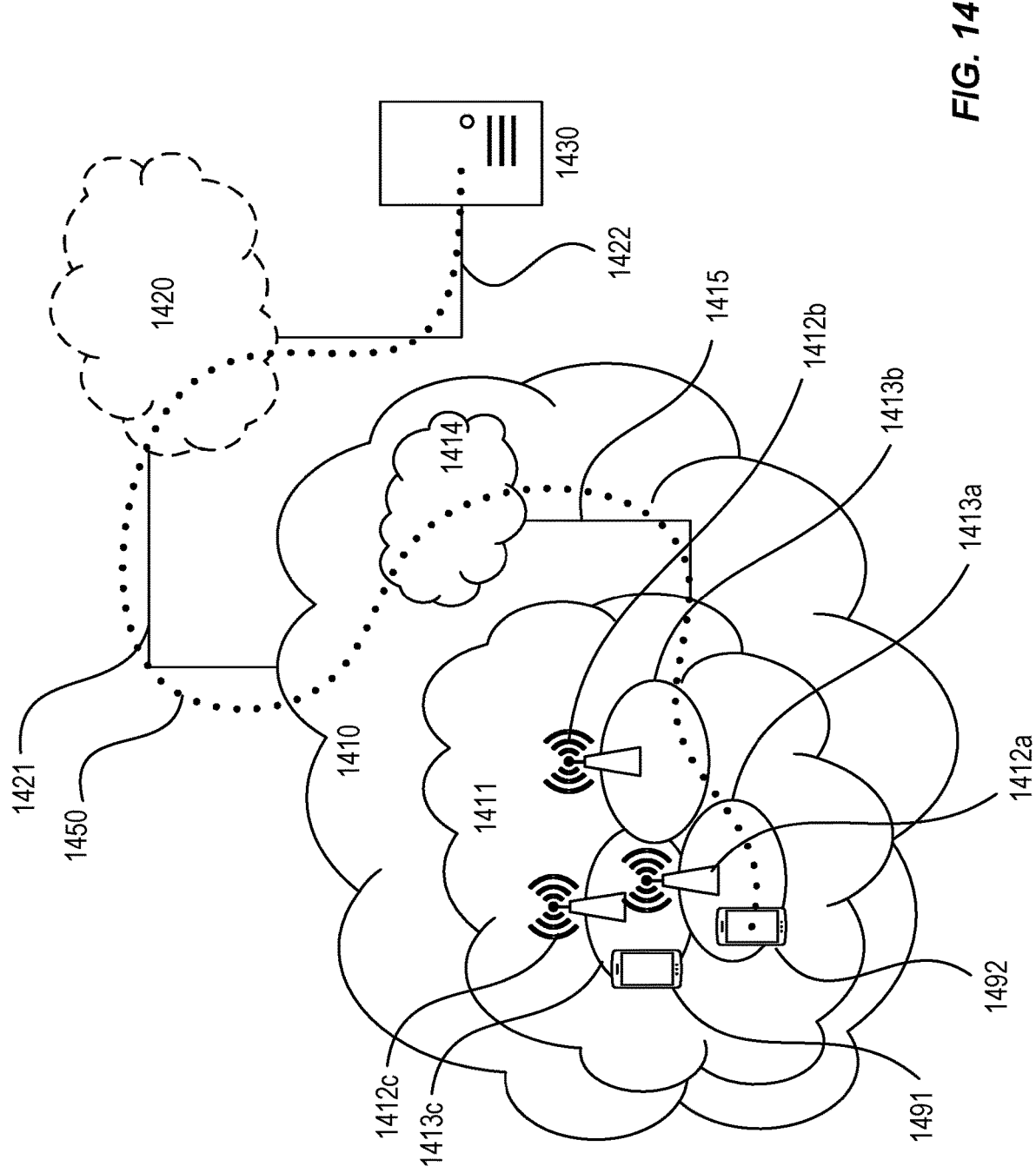
FIGS. 14-15 are block diagrams of various exemplary communication systems and/or networks, according to various exemplary embodiments of the present disclosure.

With reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412*a*, 1412*b*, 1412*c*, such as NBs, eNBs, gNBs or other types of wireless access points, each defining a corresponding coverage area 1413*a*, 1413*b*, 1413*c*. Each base station 1412*a*, 1412*b*, 1412*c* is connectable to core network 1414 over a wired or wireless connection 1415. A first UE 1491 located in coverage area 1413*c* can be configured to wirelessly connect to, or be paged by, the corresponding base station 1412*c*. A second UE 1492 in coverage area 1413*a* is wirelessly connectable to the corresponding base station 1412*a*. While a plurality of UEs 1491, 1492 are illustrated in this example, the disclosed embodiments are equally applicable to a situation where a sole UE is in the coverage area or where a sole UE is connecting to the Telecommunication network 1410 is itself connected to host computer 1430, which can be embodied in the hardware and/or software of a standalone server, a cloud-implemented server, a distributed server or as processing resources in a server farm. Host computer 1430 can be under the ownership or control of a service provider or can be operated by the service provider or on behalf of the service provider. Connections 1421 and 1422 between telecommunication network 1410 and host computer 1430 can extend directly from core network 1414 to host computer 1430 or can go via an optional intermediate network 1420. Intermediate network 1420 can be one of, or a combination of more than one of, a public, private or hosted network; intermediate network 1420, if any, can be a backbone network or the Internet; in particular, intermediate network 1420 can comprise two or more sub-networks (not shown).

The communication system of FIG. 14 as a whole enables connectivity between the connected UEs 1491, 1492 and host computer 1430. The connectivity can be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 can be transparent in the sense that the participating communication devices through which OTT connection 1450 passes are unaware of to routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 15. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which can have storage and/or processing capabilities. In particular, processing circuitry 1518 can comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 can be operable to provide a service to a remote user, such as UE 1530 connecting via OTT connection 1550 terminating at UE 1530 and host computer 1510. In providing the service to the remote user, host application 1512 can provide user data which is transmitted using OTT connection 1550.

Communication system 1500 can also include base station 1520 provided in a telecommunication system and comprising hardware 1525 enabling it to communicate with host computer 1510 and with UE 1530. Hardware 1525 can include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 can be configured to facilitate connection 1560 to host computer 1510. Connection 1560 can be direct, or it can pass through a core network (not shown in FIG. 15) of the telecommunication system and/or through one or more intermediate networks outside the telecommunication system. In the embodiment shown, hardware 1525 of base station 1520 can also include processing circuitry 1528, which can comprise one or more programmable processors, application-specific integrated circuits, field programmable gate arrays or combinations of these (not shown) adapted to execute instructions.

Base station 1520 also includes software 1521 stored internally or accessible via an external connection. For example, software 1521 can include program instructions (also referred to as a computer program product) that, when executed by processing circuitry 1528, can configure base station 1520 to perform operations corresponding to various exemplary methods (e.g., procedures) described herein.

Communication system 1500 can also include UE 1530 already referred to, whose hardware 1535 can include radio interface 1537 configured to set up and maintain wireless connection 1570 with a base station serving a coverage area in which UE 1530 is currently located. Hardware 1535 of UE 1530 can also include processing circuitry 1538, which can comprise one or more programmable processors, application-specific integrated circuits, field programmable gate arrays or combinations of these (not shown) adapted to execute instructions.

UE 1530 also includes software 1531, which is stored in or accessible by UE 1530 and executable by processing circuitry 1538. Software 1531 includes client application 1532. Client application 1532 can be operable to provide a service to a human or non-human user via UE 1530, with the support of host computer 1510. In host computer 1510, an executing host application 1512 can communicate with the executing client application 1532 via OTT connection 1550 terminating at UE 1530 and host computer 1510. In providing the service to the user, client application 1532 can receive request data from host application 1512 and provide user data in response to the request data. OTT connection 1550 can transfer both the request data and the user data. Client application 1532 can interact with the user to generate the user data that it provides. Software 1531 can also include program instructions (also referred to as a computer program product) that, when executed by processing circuitry 1538, can configure UE 1530 to perform operations corresponding to various exemplary methods (e.g., procedures) described herein.

Figure 15:
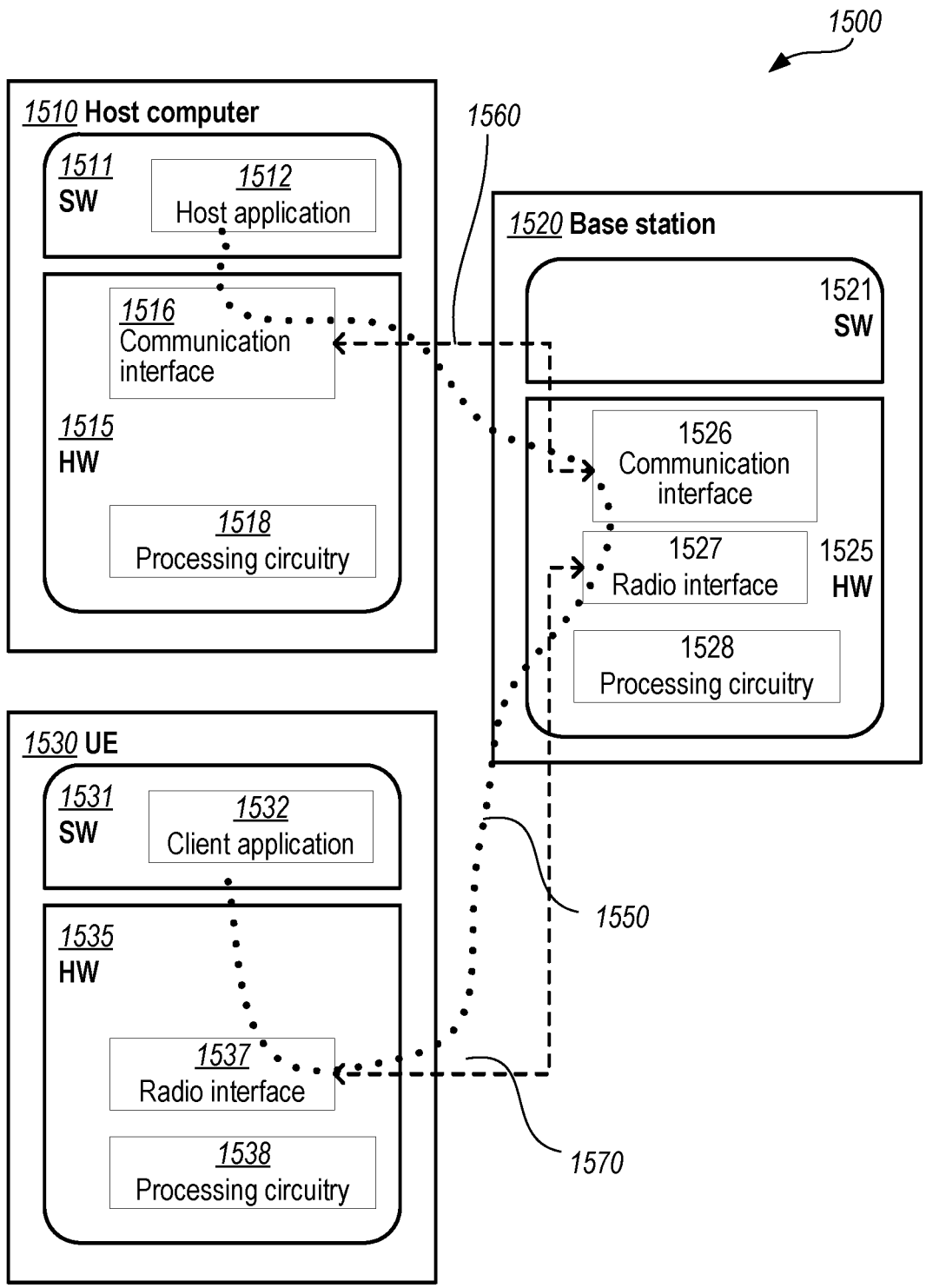

As an example, host computer 1510, base station 1520 and UE 1530 illustrated in FIG. 15 can be similar or identical to host computer 1430, one of base stations 1412a, 1412b, 1412c and one of UEs 1491, 1492 of FIG. 14, respectively. This is to say, the inner workings of these entities can be as shown in FIG. 15 and independently, the surrounding network topology can be that of FIG. 12.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure can determine the routing, which it can be configured to hide from UE 1530 or from the service provider operating host computer 1510, or both. While OTT connection 1550 is active, the network infrastructure can further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1550 between host computer 1510 and UE 1530, in response to variations in the measurement results. The measurement procedure and/or the network functionality for reconfiguring OTT connection 1550 can be implemented in software 1511 and hardware 1515 of host computer 1510 or in software 1531 and hardware 1535 of UE 1530, or both. In embodiments, sensors (not shown) can be deployed in or in association with communication devices through which OTT connection 1550 passes; the sensors can participate in the measurement procedure by supplying values of the monitored quantities exemplified above, or supplying values of other physical quantities from which software 1511, 1531 can compute or estimate the monitored quantities. The reconfiguring of OTT connection 1550 can include message format, retransmission settings, preferred routing etc.; the reconfiguring need not affect base station 1520, and it can be unknown or imperceptible to base station 1520. Such procedures and functionalities can be known and practiced in the art. In certain embodiments, measurements can involve proprietary UE signaling facilitating host computer 1510's measurements of throughput, propagation times, latency and the like. The measurements can be implemented in that software 1511 and 1531 causes messages to be transmitted, in particular empty or 'dummy' messages, using OTT connection 1550 while it monitors propagation times, errors, etc.

FIG. 16 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 16 will be included in this section. In step 1610, the host computer provides user data. In substep 1611 (which can be optional) of step 1610, the host computer provides the user data by executing a host application. In step 1620, the host computer initiates a transmission carrying the user data to the UE. In step 1630 (which can be optional), the base station transmits to the UE the user data which was carried in the transmission that the host computer initiated, in accordance with the teachings of the embodiments described throughout this disclosure. In step 1640 (which can also be optional), the UE executes a client application associated with the host application executed by the host computer.

FIG. 17 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission can pass via the base station, in accordance with the teachings of the embodiments described throughout this disclosure. In step 1730 (which can be optional), the UE receives the user data carried in the transmission.

FIG. 18 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 18 will be included in this section. In step 1810 (which can be optional), the UE receives input data provided by the host computer. Additionally or alternatively, in step 1820, the UE provides user data. In substep 1821 (which can be optional) of step 1820, the UE provides the user data by executing a client application. In substep 1811 (which can be optional) of step 1810, the UE executes a client application which provides the user data in reaction to the received input data provided by the host computer. In providing the user data, the executed client application can further consider user input received from the user. Regardless of the specific manner in which the user data was provided, the UE initiates, in substep 1830 (which can be optional), transmission of the user data to the host computer. In step 1840 of the method, the host computer receives the user data transmitted from the UE, in accordance with the teachings of the embodiments described throughout this disclosure.

FIG. 19 is a flowchart illustrating an exemplary method and/or procedure implemented to in a communication system, in accordance with one embodiment. The communication system includes a host computer, a base station and a UE which can be those described with reference to other figures herein. For simplicity of the present disclosure, only drawing references to FIG. 19 will be included in this section. In step 1910 (which can be optional), in accordance with the teachings of the embodiments described throughout this disclosure, the base station receives user data from the UE. In step 1920 (which can be optional), the base station initiates transmission of the received user data to the host computer. In step 1930 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated embodiments:

A1. A method for a data consumer network function (NF) of a communication network, the method comprising:
  sending, to a network repository function (NRF) in the communication network, a request for an access token for a service provided by a data collection coordination function (DCCF) in the communication network;
  receiving, from the NRF, at least one access token for the Service provided by the DCCF; and
  using the at least one access token, collecting data from a data producer NF in the communication network via the Service provided by the DCCF.

A2. The method of embodiment A1, wherein collecting data from the data producer NF comprises:
  sending the received at least one access token to the DCCF; and
  receiving the data from the data producer NF.

A3. The method of any of embodiments A1-A2, wherein the request for the access token includes a name or identifier of the DCCF service.

A4. The method of embodiment A3, wherein the request for the access token also includes one or more of the following:
  an identifier of data to be collected; and
  information about a producer of the data to be collected.

A5. The method of any of embodiments A3-A4, wherein:
  a single access token is received from the NRF and sent to the DCCF; and
  the single access token includes:
    an identifier of the DCCF;
    an identifier of the DCCF service;
    an identifier of the data producer NF;
    an identifier of the data procedure service; and
    an identifier of the data to be collected.

A6. The method any of embodiments A3-A4, wherein:
  first and second access tokens are received from the NRF and sent to the DCCF; and
  the first access token includes:
    an identifier of the DCCF, and
    an identifier of the DCCF service; and
  the second access token includes:
    an identifier of the data producer NF,
    an identifier of the data procedure service, and
    an identifier of the data to be collected.

A7. The method of embodiment A3, wherein:
  a single access token is received from the NRF and includes:
    an identifier of the DCCF, and
    an identifier of the DCCF service; and
  the single access token is sent to the DCCF together with one or more of the following:
    an identifier of data to be collected, and
    information about a producer of the data to be collected.

A8. The method of any of embodiments A2-A7, wherein the data is received from the data producer NF via a messaging framework associated with the DCCF.

B1. A method for a data collection coordination function (DCCF) in a communication network, the method comprising:
  receiving, from a data consumer network function (NF) in the communication network, at least one access token for a service provided by the DCCF in relation to data to be collected by the data consumer NF;
  based on the at least one access token, determining whether the data consumer NF is authorized to access the DCCF service and the data to be collected; and
  based on determining that the data consumer NF is authorized to access both the DCCF service and the data to be collected, performing the DCCF service to request a data producer NF to provide the data to the data consumer NF.

B2. The method of embodiment B1, wherein:
  a single access token is received from the data consumer NF; and
  the single access token includes:
    an identifier of the DCCF;
    an identifier of the DCCF service;
    an identifier of the data producer NF;
    an identifier of the data procedure service; and
    an identifier of the data to be collected.

B3. The method of embodiment B1, wherein:
  first and second access tokens are received from the data consumer NF; and
  the first access token includes:
    an identifier of the DCCF, and
    an identifier of the DCCF service; and
  the second access token includes:
    an identifier of the data producer NF,
    an identifier of the data procedure service, and
    an identifier of the data to be collected.

B4. The method of embodiment B3, wherein determining whether the data consumer NF is authorized to access the data to be collected is performed by the DCCF without sending the second access token to the data producer NF.

B5. The method of embodiment B1, wherein:
  a single access token is received from the data consumer NF and includes:
    an identifier of the DCCF, and
    an identifier of the DCCF service; and the single access token is received together with one or more of the following:
an identifier of the data to be collected, and
information about a producer of the data to be collected.

B6. The method of embodiment B5, wherein determining whether the data consumer NF is authorized to access the data to be collected comprises:
sending, to a network repository function (NRF) in the communication network, a request for authorization of the data consumer NF to access the data to be collected; and
receiving, from the NRF, an authorization result that indicates whether the data consumer NF is authorized to access the data to be collected.

B7. The method of embodiment B6, wherein the request for authorization includes:
an identifier of the data consumer NF,
an identifier of the data producer NF,
an identifier of the data procedure service, and
an identifier of the data to be collected.

B8. The method of any of embodiments B1-B7, further comprising, based on determining that the data consumer NF is authorized to access the data to be collected, initializing a messaging framework associated with the DCCF to transport the data from the data producer NF to the data consumer NF.

C1. A method for a network repository function (NRF) of a communication network, the method comprising:
receiving, from a data consumer network function (NF) in the communication network, a request for an access token for a service provided by a data collection coordination function (DCCF) in the communication network;
determining whether the data consumer NF is authorized to access the following:
the DCCF service, and
data to be collected from a data producer NF via the DCCF service; and
based on determining that the data consumer NF is authorized to access the DCCF service
and the data to be collected, providing one of the following:
at least one access token for the DCCF service and for the data; or
an access token for the DCCF service and an authorization for the data.

C2. The method of embodiment C1, wherein the request for the access token includes a name or identifier of the DCCF service.

C3. The method of embodiment C2, wherein the request for the access token also includes one or more of the following:
an identifier of data to be collected; and
information about a producer of the data to be collected.

C4. The method of embodiment C3, wherein:
a single access token for the DCCF service and for the data is provided to the data consumer NF; and
the single access token includes:
an identifier of the DCCF;
an identifier of the DCCF service;
an identifier of the data producer NF;
an identifier of the data procedure service; and
an identifier of the data to be collected.

C5. The method of embodiment C3, wherein:
first and second access tokens are provided to the data consumer NF;
the first access token is for the DCCF service and includes:
an identifier of the DCCF, and
an identifier of the DCCF service; and
the second access token is for the data and includes:
an identifier of the data producer NF,
an identifier of the data procedure service, and
an identifier of the data to be collected.

C6. The method of embodiment C2, wherein:
a single access token for the DCCF service is provided to the data consumer NF and includes:
an identifier of the DCCF, and
an identifier of the DCCF service; and
the method further comprises receiving, from the DCCF, a request for authorization of the data consumer NF to access the data to be collected; and
the authorization for the data is provided to the DCCF in response to the request.

D1. A data consumer network function (NF) of a communication network, the data consumer NF comprising:
interface circuitry configured to communicate with a network repository function (NRF), a data collection coordination function (DCCF), and a data producer NF in the communication network; and
processing circuitry operably coupled to the interface circuitry, whereby the processing circuitry and interface circuitry are configured to perform operations corresponding to any of the methods of embodiments A1-A8.

D2. A data consumer network function (NF) of a communication network, the data consumer NF being arranged to perform operations corresponding to any of the methods of embodiments A1-A8.

D3. A non-transitory, computer-readable medium storing computer-executable instructions that, when executed by processing circuitry associated with a data consumer network function (NF) of a communication network, configure the data consumer NF to perform operations corresponding to any of the methods of embodiments A1-A8.

D4. A computer program product comprising computer-executable instructions that, when executed by processing circuitry associated with a data consumer network function (NF) of a communication network, configure the data consumer NF to perform operations corresponding to any of the methods of embodiments A1-A8.

E1. A data collection coordination function (DCCF) of a communication network, the DCCF comprising:
interface circuitry configured to communicate with a data consumer network function (NF), a data producer NF, and a network repository function (NRF) in the communication network; and
processing circuitry operably coupled to the interface circuitry, whereby the processing circuitry and interface circuitry are configured to perform operations corresponding to any of the methods of embodiments B1-B8.

E2. A data collection coordination function (DCCF) of a communication network, the DCCF being arranged to perform operations corresponding to any of the methods of embodiments B1-B8.

E3. A non-transitory, computer-readable medium storing computer-executable instructions that, when executed by processing circuitry associated with a data collection coordination function (DCCF) of a communication network, configure the DCCF to perform operations corresponding to any of the methods of embodiments B1-B8.

E4. A computer program product comprising computer-executable instructions that, when executed by processing circuitry associated with a data collection coordination function (DCCF) of a communication network, configure the DCCF to perform operations corresponding to any of the methods of embodiments B1-B8.

F1. A network repository function (NRF) of a communication network, the NRF comprising:
interface circuitry configured to communicate with a data consumer network function (NF) and a data collection coordination function (DCCF) in the communication network; and
processing circuitry operably coupled to the interface circuitry, whereby the processing circuitry and interface circuitry are configured to perform operations corresponding to any of the methods of embodiments C1-C6.

F2. A network repository function (NRF) of a communication network, the NRF being arranged to perform operations corresponding to any of the methods of embodiments C1-C6.

F3. A non-transitory, computer-readable medium storing computer-executable instructions that, when executed by processing circuitry associated with a network repository function (NRF) of a communication network, configure the NRF to perform operations corresponding to any of the methods of embodiments C1-C6.

F4. A computer program product comprising computer-executable instructions that, when executed by processing circuitry associated with a network repository function (NRF) of a communication network, configure the NRF to perform operations corresponding to any of the methods of embodiments C1-C6.

The invention claimed is:

1. A method for a data collection coordination function (DCCF) in a communication network, the method comprising:
receiving, from a data consumer network function (NF) in the communication network, at least one access token for a service provided by the DCCF in relation to data requested by the data consumer NF;
based on the at least one access token, determining whether the data consumer NF is authorized to access the service provided by the DCCF and the requested data; and
based on determining that the data consumer NF is authorized to access both the service provided by the DCCF and the data to be collected, performing the service provided by the DCCF to request a data producer NF to provide the requested data to the data consumer NF.

2. The method according to claim 1, wherein the at least one access token includes the following: an identifier of the DCCF, and an identifier of the Service provided by the DCCF.

3. The method according to claim 1, wherein a single access token is received from the data consumer NF.

4. The method according to claim 3, wherein:
the single access token includes the following: an identifier of the DCCF, and an identifier of the service provided by the DCCF; and
the single access token is received together with one or more of the following: an identifier of the requested data, and information about the data producer NF of the requested data.

5. The method according to claim 1, wherein determining whether the data consumer NF is authorized to access the requested data comprises:
sending, to a network repository function, NRF, in the communication network, a request for authorization of the data consumer NF to access the requested data; and
receiving, from the NRF, an authorization result that indicates whether the data consumer NF is authorized to access the requested data.

6. The method according to claim 5, wherein the request for authorization includes the following: an identifier of the data consumer NF, an identifier of the data producer NF, an identifier of the data producer NF service, and an identifier of the requested data.

7. The method according to claim 1, further comprising, based on determining that the data consumer NF is authorized to access the requested data, initializing a messaging framework associated with the DCCF to transport the requested data from the data producer NF to the data consumer NF.

8. A data collection coordination function (DCCF) comprising processing circuitry and interface circuitry that are configured to perform the method according to claim 1.

9. A non-transitory, computer-readable medium storing computer-executable instructions that, when executed by processing circuitry, configure a data collection coordination function (DCCF) to perform the method according to claim 1.

10. A method for a data collection coordination function (DCCF) in a communication network, the method comprising:
receiving, from a data consumer network function (NF) in the communication network, at least one access token for a service provided by the DCCF in relation to data requested by the data consumer NF;
based on the at least one access token, determining whether the data consumer NF is authorized to access the service provided by the DCCF;
without obtaining a further access token from a network repository function (NRF) in the communication network, determining whether the data consumer NF is authorized to access the requested data;
based on determining that the data consumer NF is authorized to access both the service provided by the DCCF and the requested data, performing the service provided by the DCCF to request a data producer NF to provide the requested data to the data consumer NF.

11. The method according to claim 10, wherein the at least one access token includes the following: an identifier of the DCCF, and an identifier of the Service provided by the DCCF.

12. The method according to claim 10, wherein a single access token is received from the data consumer NF.

13. The method according to claim 12, wherein:
the single access token includes the following: an identifier of the DCCF, and an identifier of the service provided by the DCCF; and
the single access token is received together with one or more of the following: an identifier of the data to be collected, and information about the data producer NF of the requested data.

14. The method according to claim 10, wherein determining whether the data consumer NF is authorized to access the requested data comprises:
sending, to the NRF, a request for authorization of the data consumer NF to access the requested data; and receiving, from the NRF, an authorization result that indicates whether the data consumer NF is authorized to access the requested data.

15. The method according to claim 14, wherein the request for authorization includes the following: an identifier of the data consumer NF, an identifier of the data producer NF, an identifier of the data producer NF service, and an identifier of the requested data.

16. The method according to claim 10, further comprising, based on determining that the data consumer NF is authorized to access the requested data, initializing a messaging framework associated with the DCCF to transport the requested data from the data producer NF to the data consumer NF.

17. A data collection coordination function (DCCF) comprising processing circuitry and interface circuitry that are configured to perform the method according to claim 10.

18. A non-transitory, computer-readable medium storing computer-executable instructions that, when executed by processing circuitry, configure a data collection coordination function (DCCF) to perform the method according to claim 10.

\* \* \* \* \*